United States Patent
Henderson et al.

(10) Patent No.: US 9,928,300 B2
(45) Date of Patent: Mar. 27, 2018

(54) ARTIFICIAL INTELLIGENCE ARTICLE ANALYSIS INTERFACE

(71) Applicant: NewsRx, LLC, Atlanta, GA (US)

(72) Inventors: Charles W Henderson, Atlanta, GA (US); Alan D. Henderson, Watkinsville, GA (US); Chantay P. Jones, Atlanta, GA (US); Kalani K. Rosell, New Haven, CT (US)

(73) Assignee: NewsRx, LLC, Atlanta, GA (US)

( * ) Notice: Subject to any disclaimer, the term of this patent is extended or adjusted under 35 U.S.C. 154(b) by 328 days.

(21) Appl. No.: 14/827,011

(22) Filed: Aug. 14, 2015

(65) Prior Publication Data

US 2017/0017722 A1    Jan. 19, 2017

Related U.S. Application Data

(60) Provisional application No. 62/193,189, filed on Jul. 16, 2015.

(51) Int. Cl.
*G06F 17/30* (2006.01)
*G06N 5/04* (2006.01)

(52) U.S. Cl.
CPC .. *G06F 17/30867* (2013.01); *G06F 17/30554* (2013.01); *G06F 17/30598* (2013.01); *G06N 5/04* (2013.01)

(58) Field of Classification Search
CPC ......... G06F 17/30864; G06F 17/30554; G06F 17/30598
USPC .......................................................... 707/758
See application file for complete search history.

(56) References Cited

U.S. PATENT DOCUMENTS

| | | | |
|---|---|---|---|
| 2008/0183710 A1* | 7/2008 | Serjeantson | G06F 17/2705 |
| 2008/0249984 A1* | 10/2008 | Coimbatore | G06F 17/30864 |
| 2009/0299932 A1* | 12/2009 | Hodge | G06N 5/02 706/45 |
| 2012/0204104 A1* | 8/2012 | Walsh | G06F 17/30705 715/273 |

* cited by examiner

*Primary Examiner* — Thu Nguyet T Le
(74) *Attorney, Agent, or Firm* — Lee & Hayes, PLLC

(57) ABSTRACT

Technologies for an artificial intelligence article analysis interface are described. The interface is configured to render one or more metrics associated with articles written using artificial intelligence. In some examples, the interface data is provided by an article analyzer. The article analyzer may analyze one or more articles and provide one or more outputs. The article analyzer may receive as an input one or more articles provided by an artificial intelligence journalist or human journalist.

17 Claims, 20 Drawing Sheets

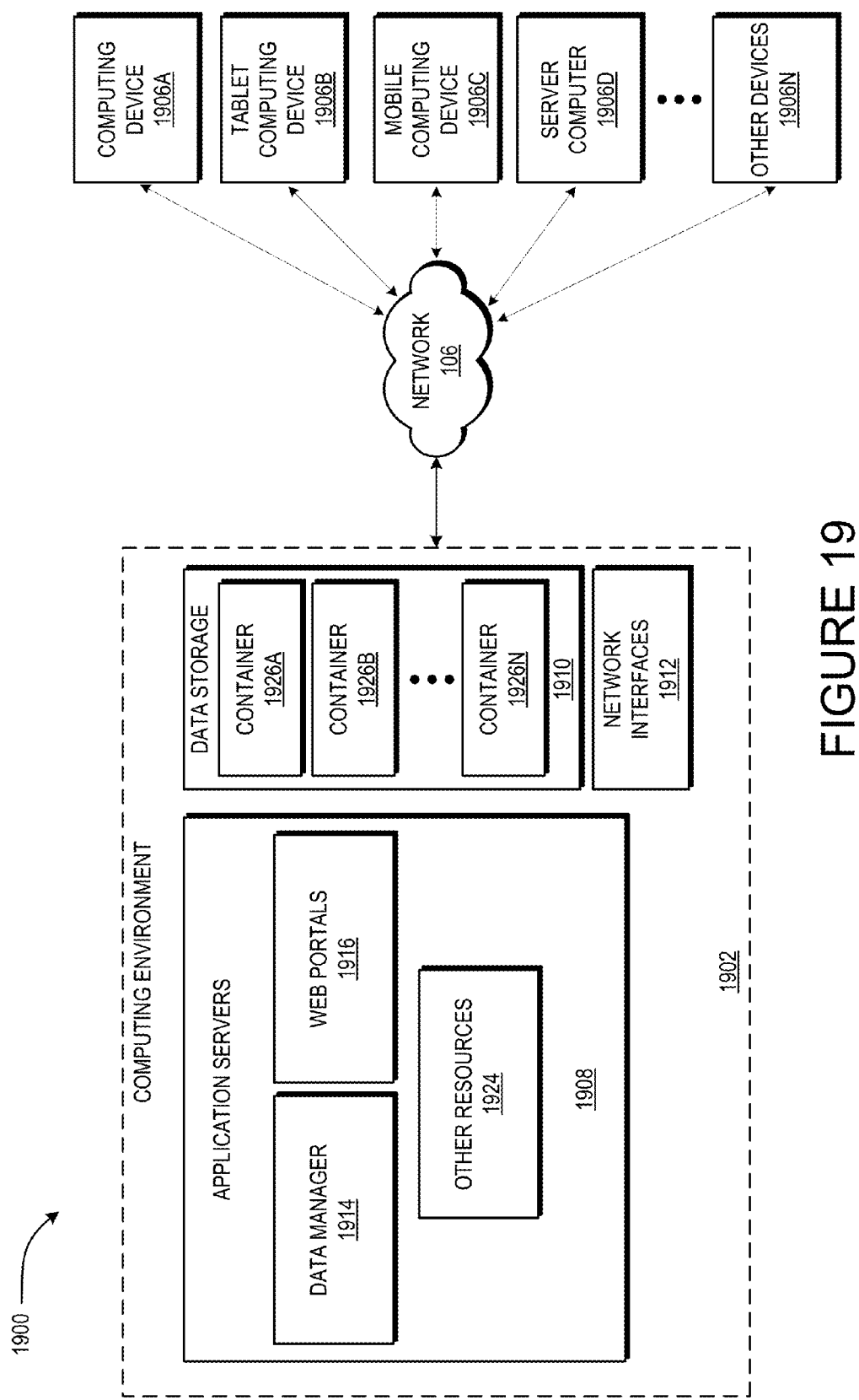

ARTIFICIAL INTELLIGENCE ARTICLE ANALYSIS INTERFACE

CROSS-REFERENCE TO RELATED APPLICATION

This application claims the priority of U.S. Provisional Patent Application No. 62/193,189, filed Jul. 16, 2015, the entire disclosure and contents of which are hereby incorporated by reference herein.

BACKGROUND

Internet news services are becoming increasingly common. Internet news services may act as news sources or news aggregators. Generally, a news source is an individual or organization that observes events and generates news articles about the event. A news aggregator may collect one or more news articles provided by one or more news source and provided the collected news articles to a reader. The two types of news services are not mutually exclusive. In some contexts, a news source may also act as a news aggregator, and a news aggregator may act as a news source.

It is with respect to these and other considerations that the disclosure made herein is presented.

SUMMARY

The following detailed description is directed to technologies for an artificial intelligence article analysis interface. The interface is configured to render one or more metrics associated with articles written using artificial intelligence. In some examples, the interface data is provided by an article analyzer. The article analyzer may analyze one or more news stories and provide one or more outputs. The article analyzer may receive as an input one or more articles provided by an artificial intelligence journalist or human journalist.

The artificial intelligence journalist may access one or more data sources providing information about an event. The artificial intelligence journalist may apply an algorithm to draft a news article from the one or more data sources. The article analyzer may analyze the articles drafted by the artificial intelligence journalist as well as articles drafted by a human and determine one or more metrics or outputs.

In some examples, the artificial intelligence article analysis interface may be used as a search-based application. For example, the interface may be used to find and retrieve articles created by artificial intelligence. Keywords associated with the articles may be used as searchable terms to identify articles relating to a particular search query.

It should be appreciated that the subject matter described herein may be implemented as a computer-implemented method, computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure

BRIEF DESCRIPTION OF THE DRAWINGS

FIG. 7 is a diagram showing an application dashboard rendering a custom topics section.

FIG. 9 is a diagram showing an application dashboard after a search is performed by a server computer in conjunction with an analysis function.

FIG. 10A is a diagram showing an application dashboard after various filters and other inputs are applied to search results.

FIG. 13 is a diagram showing an application dashboard having rendered therein a download interface.

FIG. 19 illustrates an illustrative distributed computing environment capable of executing the software components described herein for an artificial intelligence article analysis interface.

DETAILED DESCRIPTION

Figure 1:
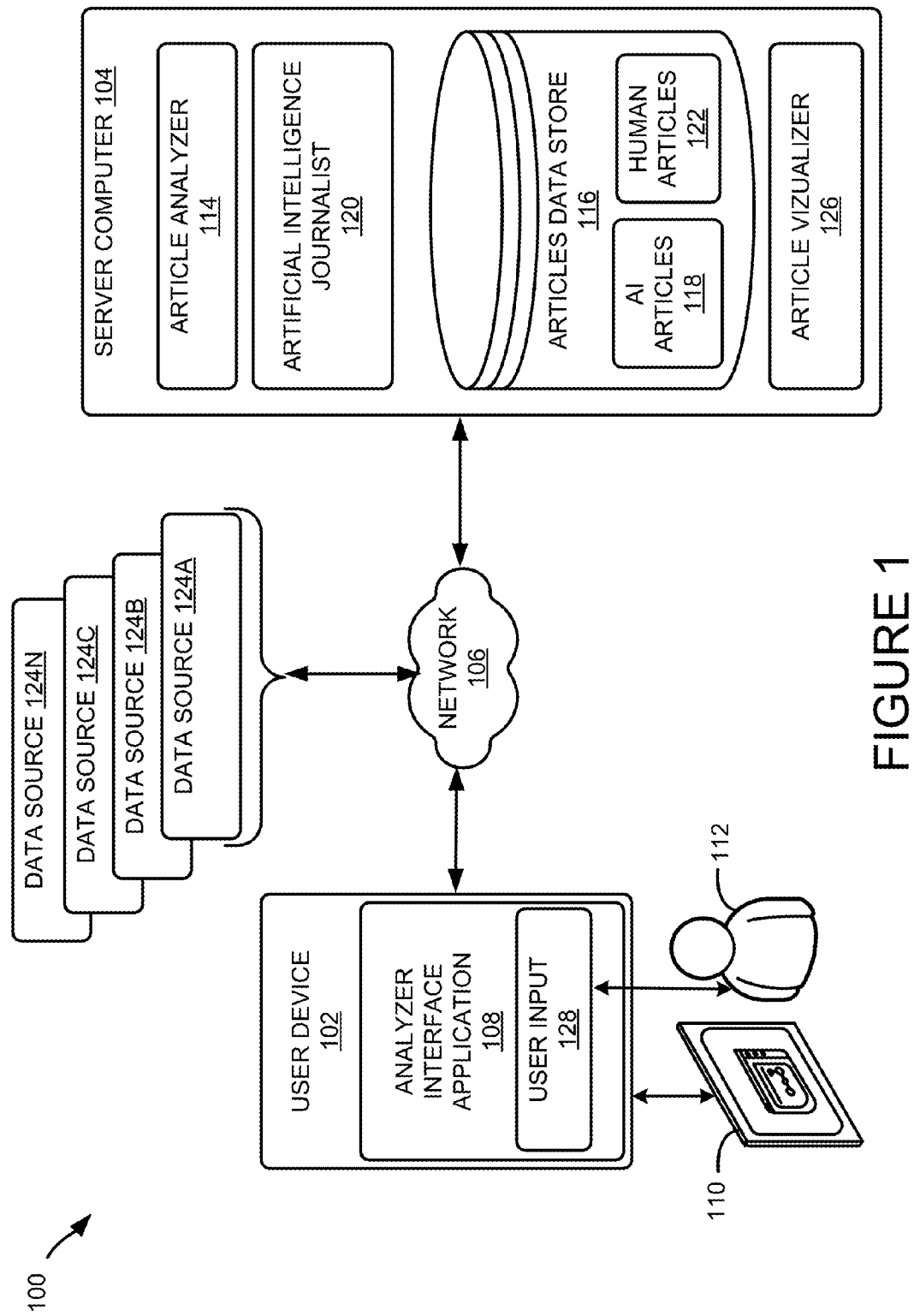
FIG. 1 is a system diagram showing one illustrative operating environment that may be used to implement various embodiments described herein.

Embodiments of the disclosure presented herein encompass technologies for an artificial intelligence article analysis interface. In the following detailed description, references are made to the accompanying drawings that form a part hereof, and in which are shown by way of illustration specific embodiments or examples. Referring now to the drawings, aspects of an example operating environment and some example implementations provided herein will be described.

FIG. 1 is system diagram showing one illustrative operating environment 100 that may be used to implement various embodiments described herein. The operating environment 100 may include a user device 102 and a server computer 104. The user device 102 and/or the server computer 104 are not limited to any particular type or configuration of computing platform.

The user device 102 and/or the server computer 104 may be one or more computing devices that, when implemented together, may be used as a user device 102 and/or a server computer 104. The user device 102 and/or the server computer 104 may be implemented in various forms, including, but not limited to, a mobile device, a cell phone, a tablet computer, a desktop computer, a laptop computer, and the like. The presently disclosed subject matter is not limited to any particular implementation. In some implementations of the presently disclosed subject matter, all or some of the features may be implemented on either the user device 102 and/or the server computer 104.

The user device 102 may be placed in communication with the server computer 104 using a network 106. FIG. 1 illustrates one user device 102, one network 106, and one server computer 104. It should be understood, however, that some implementations of the operating environment 100 include multiple user devices 102, multiple networks 106, and/or multiple server computers 104. The illustrated examples described above and shown in FIG. 1 should be understood as being illustrative, and should not be construed as being limiting in any way. It should be understood that the concepts and technologies disclosed herein are not limited to an operating environment 100 connected to a network or any external computing system, as various embodiments of the concepts and technologies disclosed herein can be implemented locally on the user device 102 and/or the server computer 104.

The user device 102 may be configured to initiate and execute an analyzer interface application 108. In some examples, the analyzer interface application 108 may be an application configured to receive one or more inputs and render the inputs in a user interface, examples of which are provided below, on a display 110. The analyzer interface application 108 may receive one or more inputs from a user 112 to control one or more features rendered by the analyzer interface application 108. In some examples, the analyzer interface application 108 may be an Internet browser.

The analyzer interface application 108 may be configured to communicate with an article analyzer 114 executed by the server computer 104. The article analyzer 114 may be configured to access an articles data store 116. The articles data store 116 is configured to store artificial intelligence ("AI") articles 118 written by an artificial intelligence journalist 120 and human articles 122 provided by human sources. As used herein, an article is a piece of writing that refers to and discusses, at least in part, an event.

The presently disclosed subject matter is not limited to any particular type or form of article, and may include, but is not limited to, a short description of an event, a book, a report, narrative, analytics, and the like. As used herein, an event includes an occurrence of something, and is not limited to any particular kind of event. For example, an event may be a sports contest, a financial occurrence, the disclosure of research, and the like. The presently disclosed subject matter is not limited to any particular type of event.

As used herein, artificial intelligence refers to intelligence provided by machines or computers. As used herein, the artificial intelligence journalist 120 is a computer or process whereby a computer, such as the server computer 104, applies algorithms to event information and generates the AI articles 118. In one example, event information may be received by the article analyzer 114 when searching and accessing data sources 124A-124N ((hereinafter referred to collectively and/or generically as "the data sources 124" and individually as "the data source 124A," and the like). The data sources 124 may include documents or information provided by one or more sources that relate to an event.

In some examples, artificial intelligence journalist 120 may receive as input event information about an event provided by the data sources 124. The artificial intelligence journalist 120 may apply one or more filters to reduce or eliminate certain types of information. For example, the artificial intelligence journalist 120 may apply a filter to raw information that recognizes non-factual, opinion, colloquial, relativistic, or others types of information to create filtered information. The artificial intelligence journalist 120 may thereafter add information to the filtered information to connect various concepts found in the filtered information to provide for enhanced information. The enhanced information may thereafter be stored as the AI article 118.

For example, the artificial intelligence journalist 120 may receive the following snippet of an article from the data sources 124:
Scientists in Belgium report that Mary has discovered a new element. Mary is from South Carolina and enjoys surfing and racquetball. Mary has named the element, Marium. We do not think that Mary is telling the truth and would like to see the final outcome when published in Scientist Daily.

As can be seen in the article above, the article includes factual information, opinion information (We do not think . . . ), and information that is not relevant (Mary is from . . . ) to the main story ( . . . discovered a new element). In some examples, the artificial intelligence journalist may apply one or more filters to create the filtered information. In one example, the artificial intelligence journalist may identify the particle event (or subject) of the article: the discovery of a new element.

The artificial intelligence journalist 120 may then analyze the article to determine which words or sentences are most likely applicable to the event and maintain those words or sentences while filtering out or removing the words or sentences that are least likely applicable. The following may be the result of the filtering operation:
Scientists in Belgium report that Mary has discovered a new element . . . Mary has named the element, Marium . . . final outcome when published in Scientist Daily.

As can be seen in the example provided above, while condensed to information relating to the event, if read by a human, the above information may not be easy or pleasant to read. The artificial intelligence journalist 120 may then apply information to create enhanced information, resulting in the AI articles 118.

Continuing with the example above, the enhanced article may be the following (with additions shown underlined and subtractions shown with strikethroughs only for purposes of description).
Scientists in Belgium report that Mary has discovered a new element. Mary has named the element, Marium. [The] final outcome will be published in Scientist Daily.

It should be noted that the presently disclosed subject matter is not limited to the above-described algorithm, and may include other technologies for generating artificial intelligence articles. For example, a human or artificial intelligence generated article may be received. Using technologies, such as text mining, important concepts or items within the article may be mined, the concepts of which may be the primary topic of the article, the origin of research relating to the article, various introductory phrases, research methods and/or protocols identified in the article, results discussed in the article, or other items that are identified as concepts of greater importance than other concepts.

The user 112, or other entity, may request that the AI articles 118 and/or the human articles 122, be analyzed to provide some metrics, examples of which are described in various figures below. The article analyzer 114 may invoke an article visualizer 126. The article visualizer 126 may receive one or more metrics generated by the article analyzer 114 and output one or more visualizations to be rendered in the display 110. The user 112 may provide a user input 128 to select the visualizations, described in more detail below.

Figure 2:
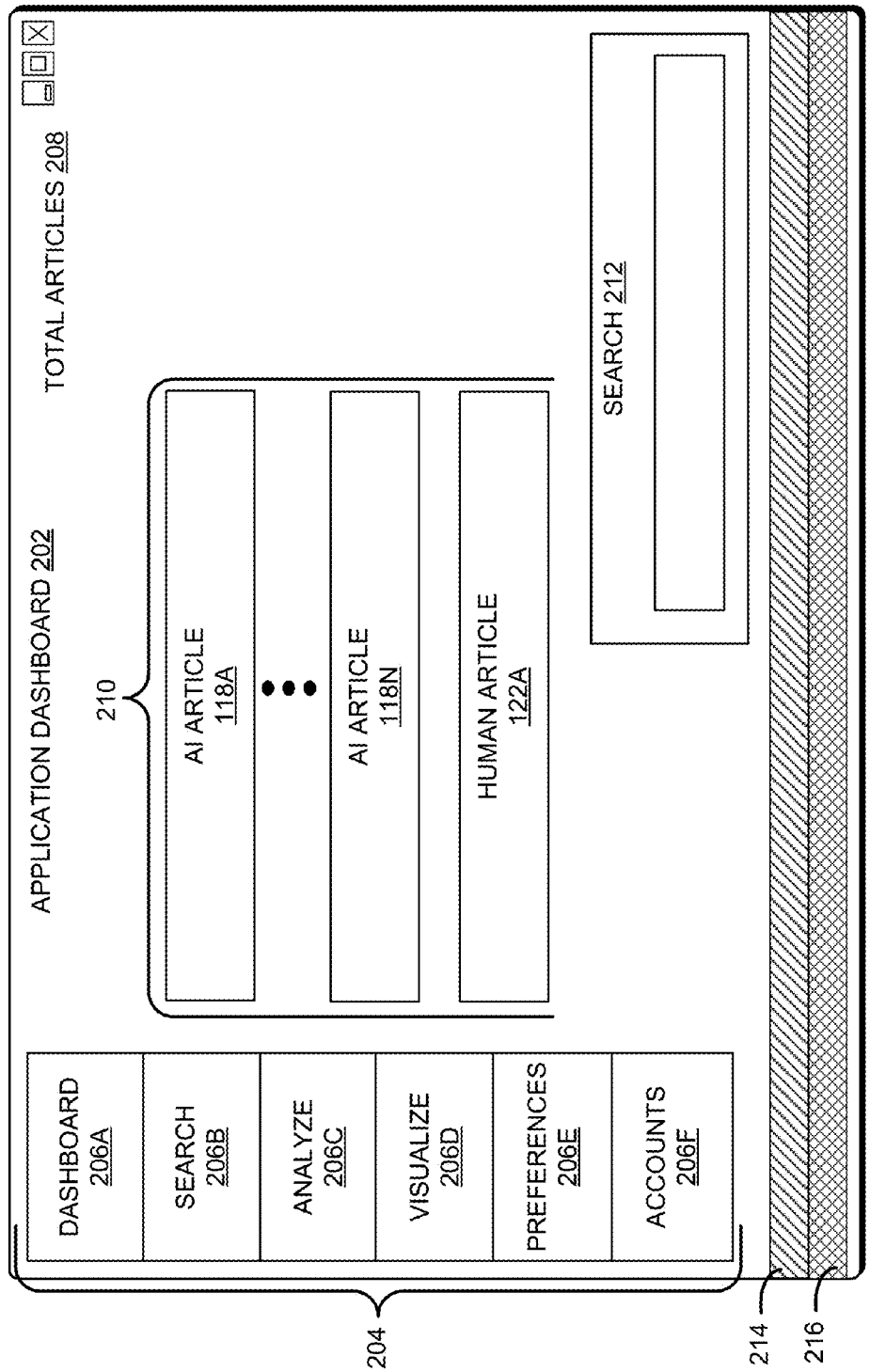
FIG. 2 is a diagram showing an application dashboard for displaying metrics provided by an article analyzer.

FIG. 2 is a diagram showing an application dashboard 202 for displaying metrics provided by inter alia the article analyzer 114 of FIG. 1. The application dashboard 202 may be rendered within or in conjunction with the analyzer interface application 108 of FIG. 1. In some examples, the analyzer interface application 108 may be an Internet browser configured to receive inputs from the user device 102 and communicate with one or more remote servers, such as the server computer 104, through an Internet connection, such as one provided by the network 106. In other examples, the analyzer interface application 108 may be another type of application capable of performing the functions described herein. The presently disclosed subject matter is not limited to any particular type of application.

The application dashboard 202 may include a control section 204. The control section 204 may include one or more selectable controls. In the example illustrated in FIG. 2, the one or more selectable controls include a dashboard control 206A, a search control 206B, an analyze control 206C, a visualize control 206D, a preferences control 206E, and an accounts control 206F (hereinafter referred to collectively and/or generically as "the controls 206" and individually as "the dashboard control 206A," and the like). The controls 206 may be configured to receive an input and perform a certain function. For example, the dashboard control 206A is configured to receive an input and display the application dashboard 202. The preferences control 206E is configured to receive a selection input to allow a user to determine various configurations. The accounts control 206F is configured to receive a selection input to allow a user to access various user accounts associated with the analyzer interface application 108. The other controls 206 are described in more detail below.

The application dashboard 202 may also include a total articles indicator 208. The total articles indicator 208 may be a numerical counter that indicates a total number of articles. The total number of articles may be the total number of AI articles 118, the total number of human articles 122, or other totals as may be appropriate or desired. The presently disclosed subject matter is not limited to any particular type of total or source of articles.

The application dashboard 202 may also include an articles section 210. The articles section 210 may include AI articles 118A-118N and/or human article 122A. It is noted that the presently disclosed subject matter is not limited to any particular number or type of each type of article. The articles rendered in the articles section 210 may be selectable links that, when selected, render the particle article within the application dashboard 202 or another interface. The AI articles 118A-118N and/or the human article 122A may be rendered based on various factors. For example, the articles may be selected based on one or more searches, user preferences, and the like.

The application dashboard 202 may also include a search input 212. The search input 212 is configured to receive one or more textual or other types of inputs. The inputs received at the search input 212 are used by the analyzer interface application 108 to perform a search on the articles data store 116. Relevant results are returned and rendered in the application dashboard 202. For example, the search results may be rendered as articles in the articles section 210.

The application dashboard 202 may also include information ticker 214 and article ticker 216. The information ticker 214 may include general information such as information about the analyzer interface application 108, the application dashboard 202, and the like. The article ticker 216 may be summarized versions of articles, such as the articles in the articles section 210.

Figure 3:
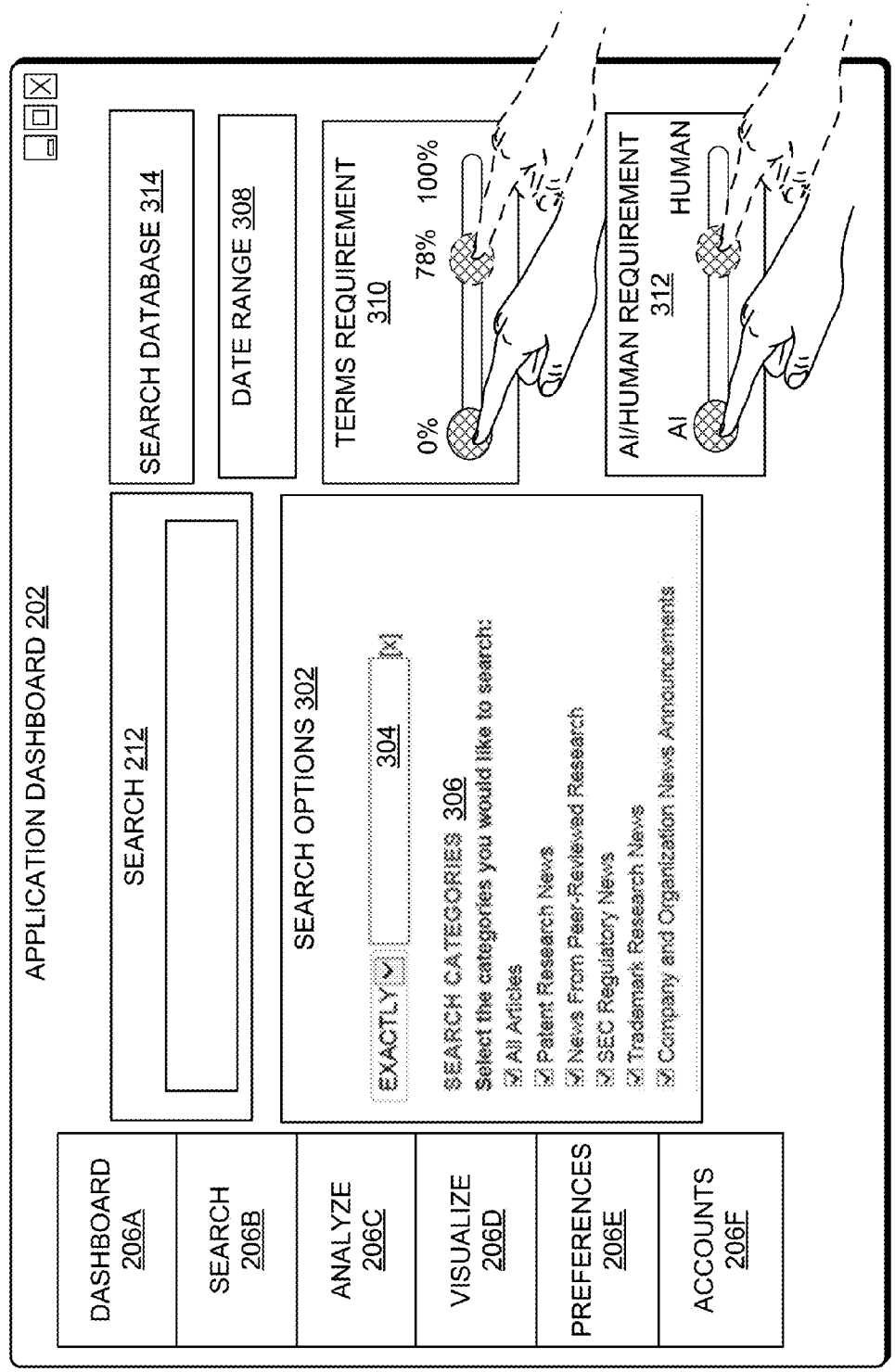
FIG. 3 is a diagram showing an application dashboard when using a search function.

FIG. 3 is a diagram showing the application dashboard 202 when using a search function. In FIG. 3, upon the selection of a search function, such as the selected search control 206B, the application dashboard 202 is modified to display various search tools. The application dashboard 202 may render the search input 212 to receive one or more search inputs.

The application dashboard 202 may also render search options 302. The search options 302 may include or more selectable options for providing input in addition to or in lieu of the input received in the search input 212. In the example illustrated, the selectable options include a Boolean operator 304 and search categories 306. The Boolean operator 304 may be configured to receive one or more inputs and apply a particular Boolean function on the search terms. The search categories 306 include one or more selectable and de-selectable sources of information.

In the example illustrated, the search categories 306 include sources such as SEC regulatory news, trademark research news, and the like. In some configurations, the AI articles 118 and/or the human articles 122 may be categorized according to their subject matter. The subject matter may be assigned as a particle source, such as a journal or publication. In the example illustrated, AI articles 118 relating to patents are categorized within the journal, "Patent Research News." In another example, AI articles 118 relating to academic or commercial research may be categorized within the journal, "News From Peer-Reviewed Research." It is noted that the AI articles may be categorized in more than one journal or source. The search categories 306, if unselected or selected, may be used to exclude or include articles from a particular source, respectively, when performing a search.

The application dashboard 202 may further include a data range input 308. The date range input 308 may be configured to receive in input from a user. The input may be a desired date range within which the AI articles 118 and/or the human articles 122 should be included in a search, and, outside of which the AI articles 118 and/or the human articles 122 should not be included in a search.

The application dashboard 202 may also include a terms requirement input 310. The terms requirement input 310 may be used to receive an input regarding the percentage of terms entered in the search input 212 that are required in the search results. For example, if the terms requirement input 310 is at the 0% position, any term in the search input 212 is required to be found in the articles as a result of the search. If the terms requirement input 310 is moved towards the 100% position, such as the 78% position, 78 percent of the terms are required to be found in the articles as a result of the search. At the 100% position, all terms in the search input 212 are required to be found in the articles as a result of the search.

The application dashboard 202 may additionally include an AI/human requirement input 312. The AI/human requirement input 312 may receive an input to provide a desired ratio of AI to human articles provided as a result of the search. For example, if at the AI position, all articles returned as a result of a search are within the AI articles 118. If at the Human position, all articles returned as a result of a search are within the human articles 122. If at a position between the AI position and the Human position, a ratio of articles in the AI articles 118 and the human articles 122 is returned, the ratio depending on the position in the AI/human requirement input 312.

The application dashboard 202 may also include a search database input 314. The search database input 314 is configured as a selectable input. When selected, the search database input 314 invokes a search by the analyzer interface application 108 using the terms entered in the search input 212 as well as the other input described in FIG. 3. It is noted, however, that other types of input may be used when performing a search and are considered to be within the scope of the presently disclosed subject matter.

Figure 4:
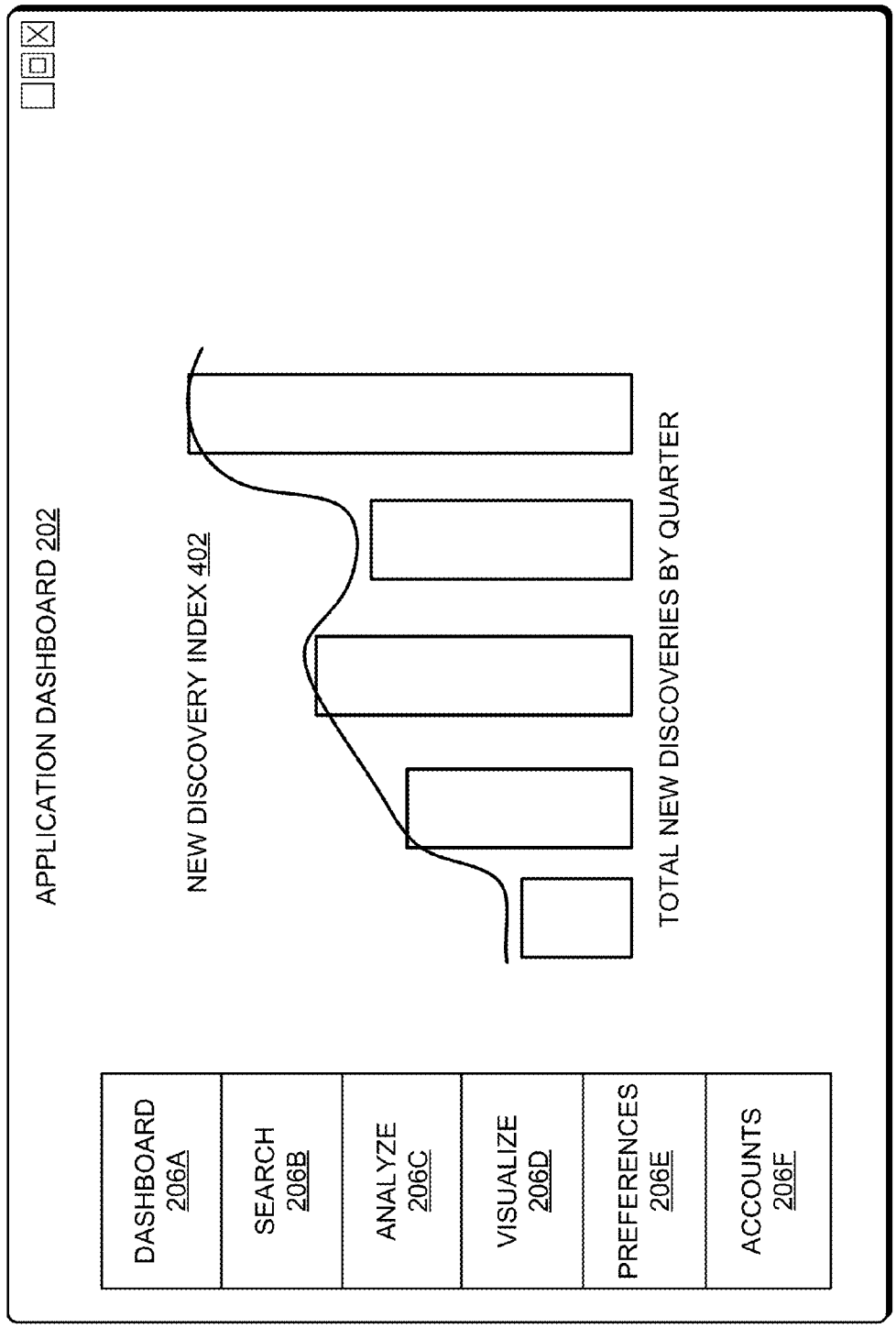
FIG. 4 is a diagram showing an application dashboard rendering a new discovery index.

FIG. 4 is a diagram showing the application dashboard 202 rendering a new discovery index 402. The new discovery index 402 may be a graphical or numerical display showing a number of new discoveries for a particular time period. As used herein, a new discovery means a person, place, or thing that has been discovered. In some examples, a new discovery includes discoveries resulting from scientific research endeavors. In this example, the AI articles 118 may be analyzed to determine if the content within one or more of the AI articles 118 includes a new discovery.

A new discovery may be identified using various technologies. For example, a new discovery may be identified by terms or phrases commonly found in articles discussing new discoveries. In one example, the terms may include, but are not limited to, "discovery," "uncovered," and "found." The articles that include new discoveries may be categorized according to the subject matter of the article and the number summed to determine a total, which may be displayed in the new discovery index 402 for a particular time period. The new discovery index 402 may include the total number of all new discoveries or may include only new discoveries for particular subject matter, or various combinations.

Figure 5:
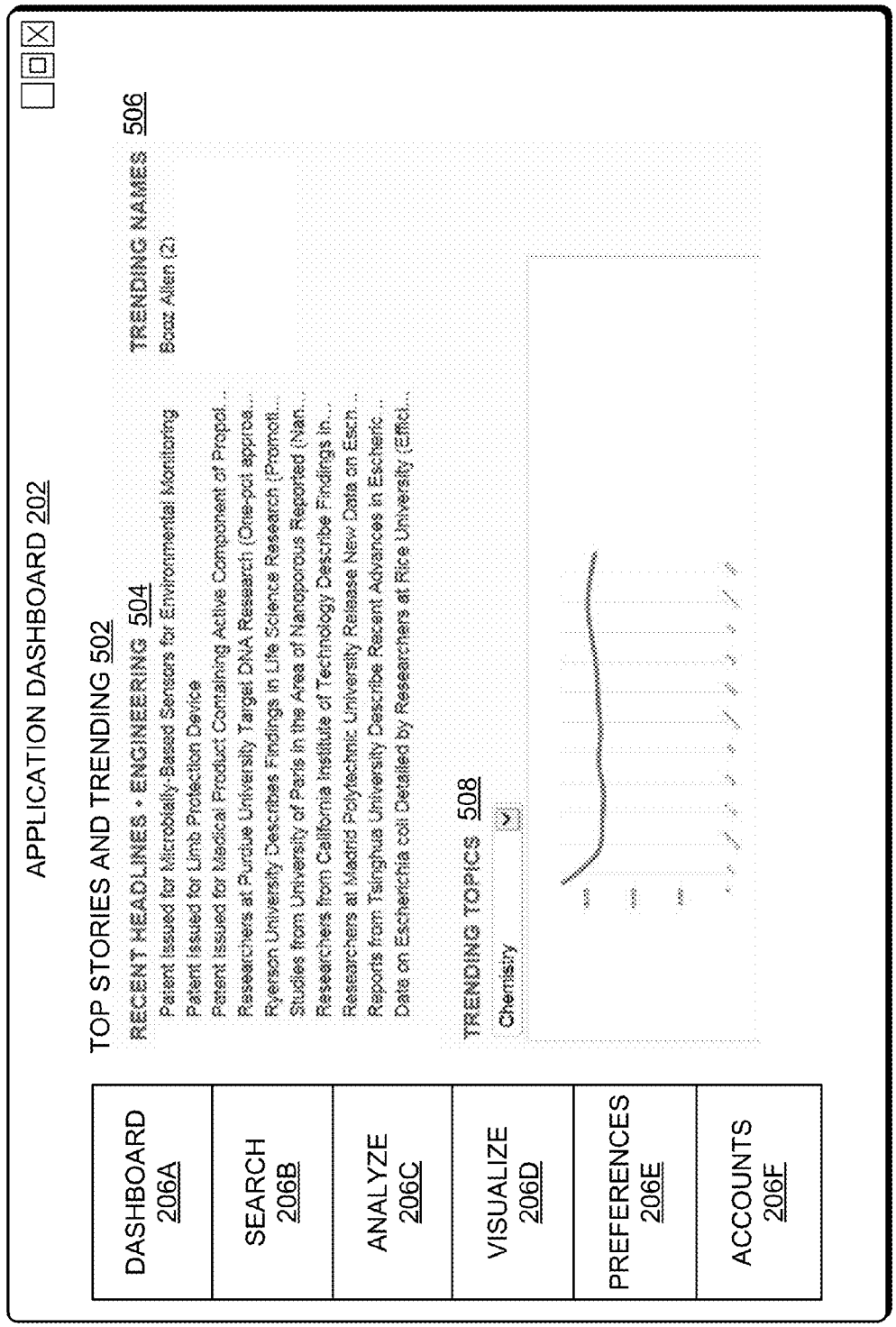
FIG. 5 is a diagram showing an application dashboard rendering a top stories and trending section.

FIG. 5 is a diagram showing the application dashboard 202 rendering a top stories and trending section 502. In some examples, the analyzer interface application 108 may analyze the AI articles 118, the human articles 122, and/or the data sources 124 to determine topics or subject matter that is trending. As used herein, "trending" means that the topic or subject matter is present within a certain percentage of articles or its use is increasing at a certain rate.

The top stories and trending section 502 may include a recent headlines section 504. The recent headlines section 504 may include articles about a particular topic (e.g. engineering in the example illustrated in FIG. 5) that have recently been generated or generated within a specific time.

The top stories and trending section 502 may include a trending names section 506. The trending names section 506 may list one or more names of people or entities that are trending. The names may also include the number of articles in which the names are present. In the example illustrated in FIG. 5, the name BOOZ ALLEN is present in two (2) articles.

The top stories and trending section 502 may include a trending topics section 508. The trending topics section 508 may be a graphical display showing the number of trending articles or total number of articles for a particular topic over a particular time period. In the example illustrated in FIG. 5, the total number of articles for the topic CHEMISTRY is rendered.

Figure 6:
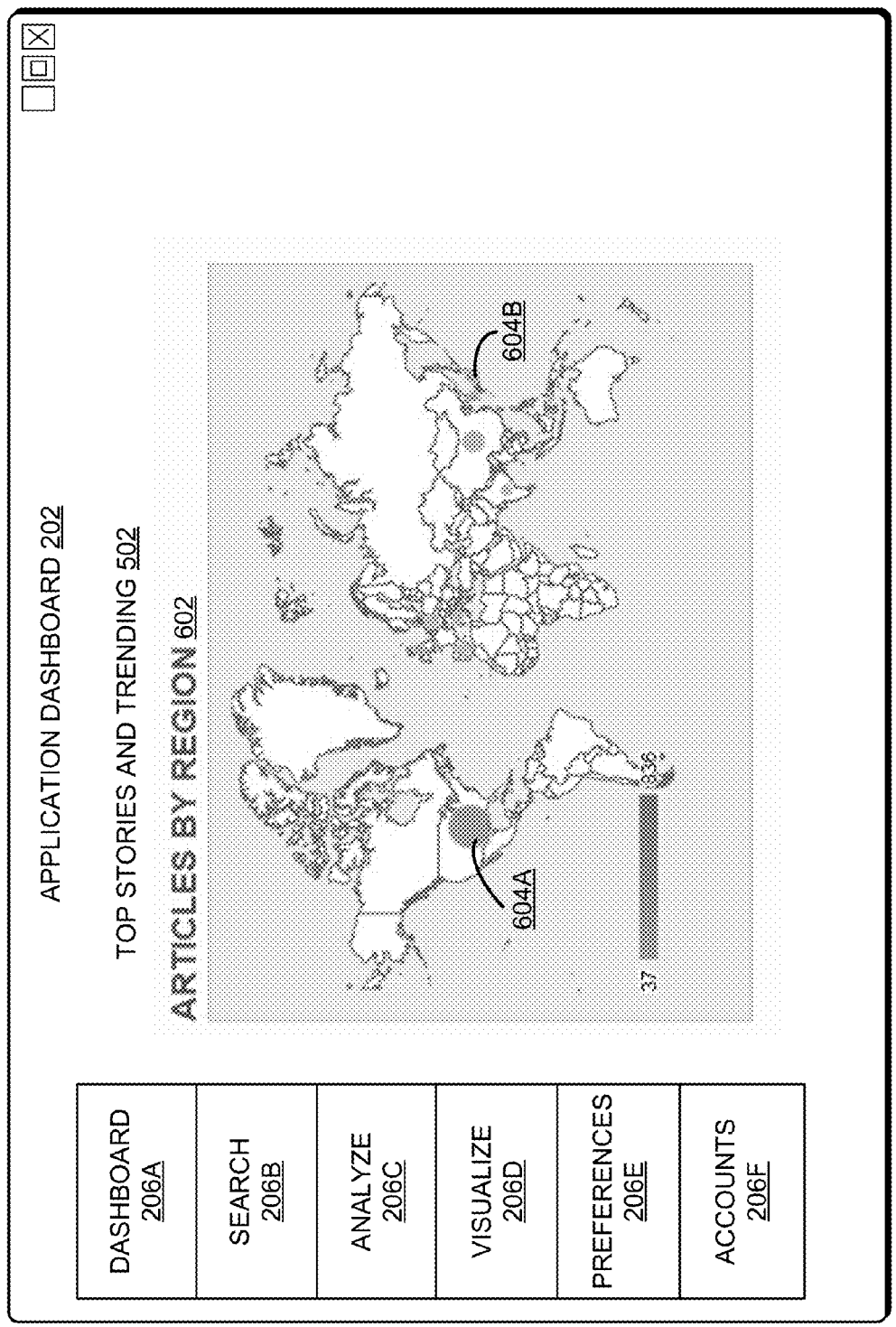
FIG. 6 is a diagram showing an application dashboard rendering a top stories and trending section having an articles by region section.

FIG. 6 is a diagram showing the application dashboard 202 rendering a top stories and trending section 502 having an articles by region section 602. In FIG. 6, the articles by region section 602 may be a graphical display showing the number of articles generated for a particular topic (or number of articles generated overall) for a particular location.

In the example illustrated in FIG. 6, the size of the circle, such as circle 604, provides a visual display of the numbers of articles. In FIG. 6, the circle 604A is larger than the circle 604B. Thus, in relative terms, the number of articles generated in the location of the circle 604A is greater than the number of articles generated in the location of the circle 604B, both of which are greater than areas in which no circles are located.

Figure 7:
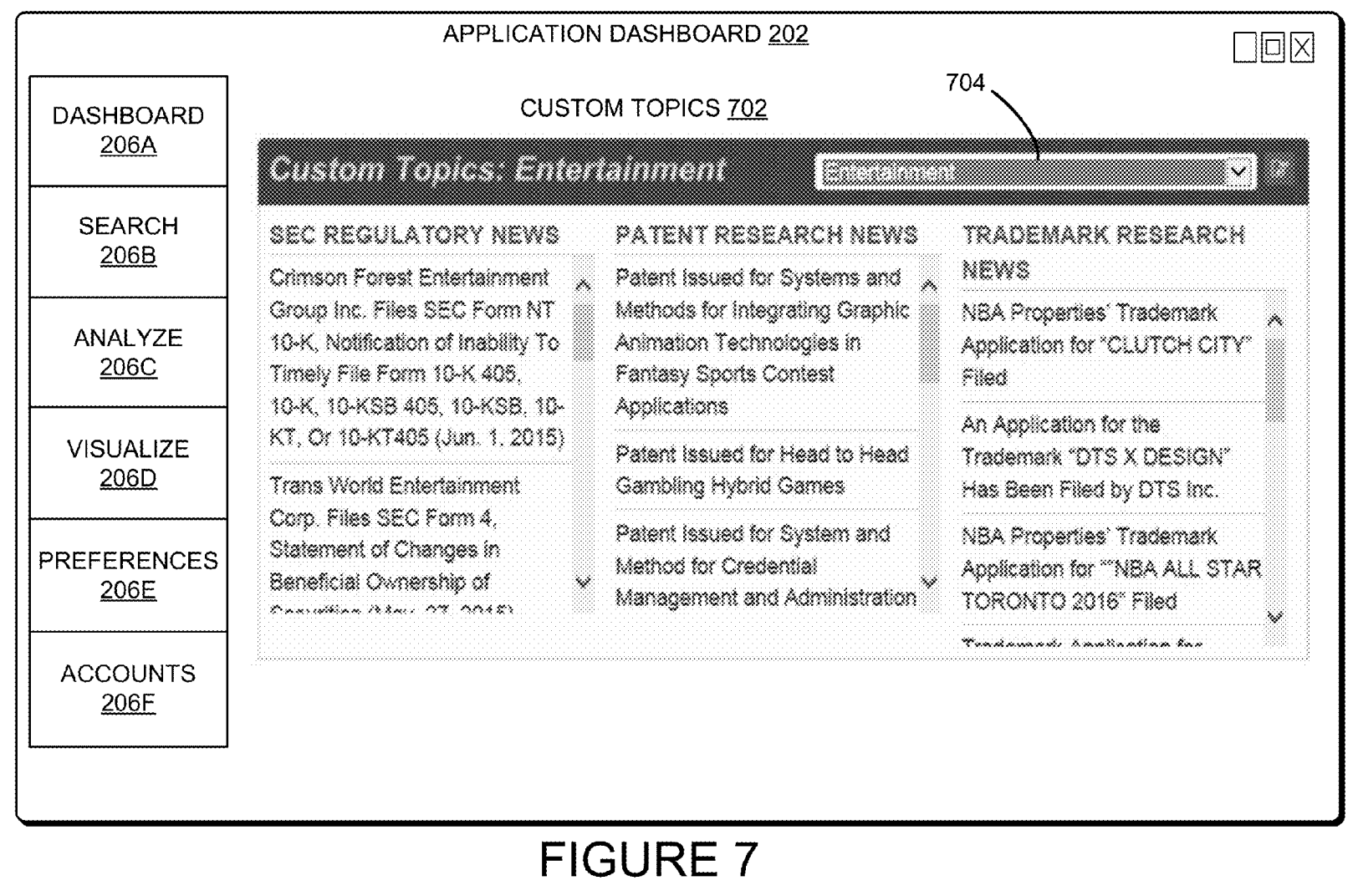

FIG. 7 is a diagram showing the application dashboard 202 rendering a custom topics section 702. In some configurations, the custom topics section 702 may be a configurable section that receives an input of what to render in the custom topics section 702. The input may be one or more subject matter areas. In another example, articles of different subject matter may be displayed for a particular topic.

In the example illustrated in FIG. 7, the topic of "entertainment" is selected in a topics selector 704 for the general subject matter areas "SEC Regulatory News," "Patent Research News," and "Trademark Research News." Articles of those general subject matters relating to entertainment may be rendered in the custom topics section 702. It is noted that, in some configurations, the general subject matter areas may be changed.

Figure 8:
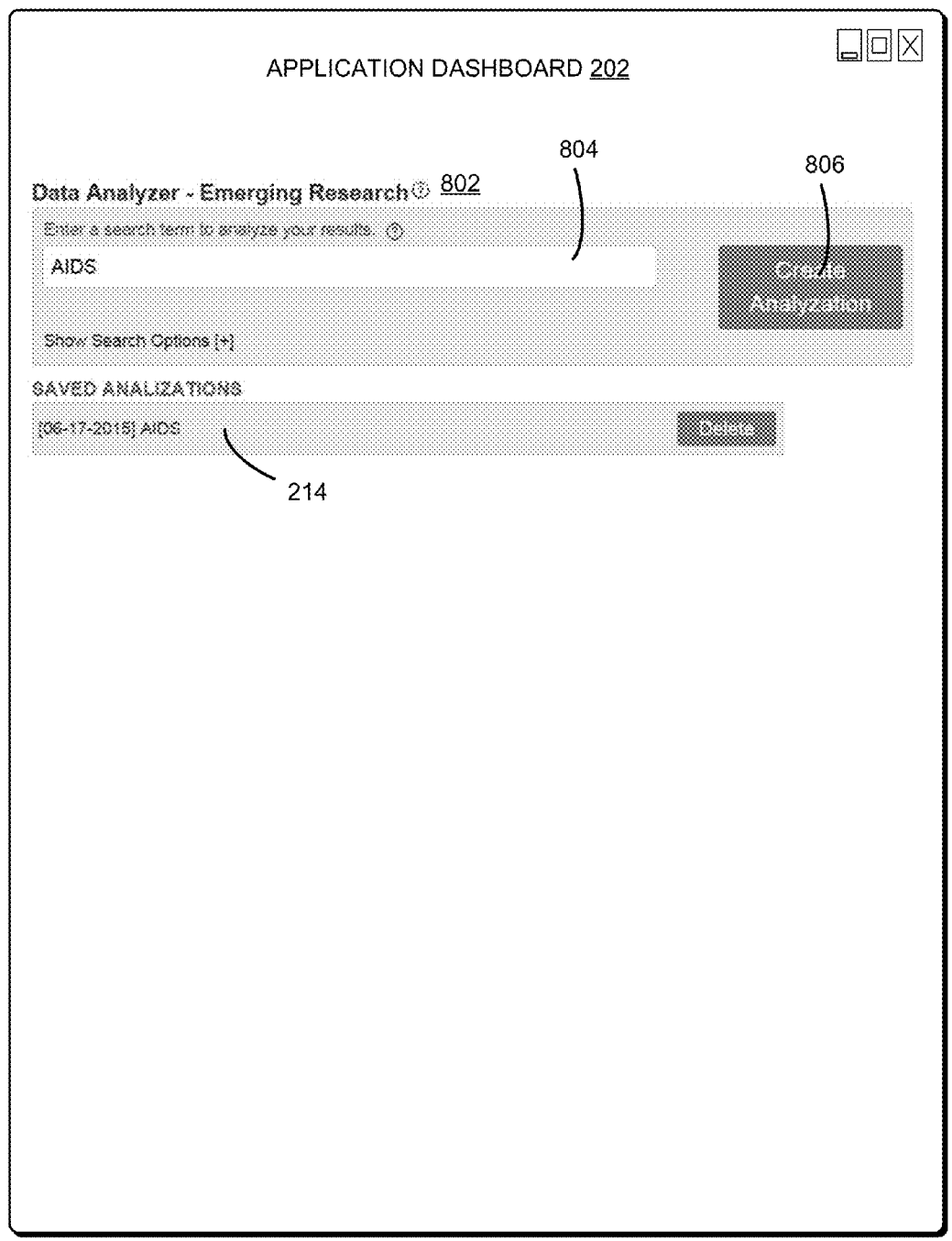
FIG. 8 is a diagram showing an application dashboard by which an analysis is conducted.

FIG. 8 is a diagram showing the application dashboard 202 by which an analysis is conducted. In some configurations, it may be beneficial or desired to analyze the AI articles 118 and/or the human articles 122. An analysis of the AI articles 118 and/or the human articles 122 may, among other possible benefits, yield useful information about the AI articles 118 and/or the human articles 122 other than the information contained within the articles themselves.

If, in FIG. 2, an input is received at the analyze control 206C (or another input similarly configured), the application dashboard 202 may take the configuration of FIG. 8. The application dashboard 202 has rendered therein a data analyzer search input 802. The data analyzer search input 802 includes a terms input 804 and a create analyzation input 806. To commence an analysis, one or more terms may be received as inputs in the terms input 804 and the create analyzation input 806 is selected. Previously saved analizations may be found in the saved analizations section 214.

Upon the receipt of the selection of the create analization input 806, the analyzer interface application 108 transmits a search query to the server computer 104 with the terms entered into the terms input 804. The server computer 104 searches the articles data store 116 for one or more articles relating to the search terms entered in the terms input 804. Once the create analization input 806 is selected and the search is performed, the search results are returned to the analyzer interface application 108. In some examples, the search used may be termed a "faceted" search.

In some examples, a faceted search is a dynamic clustering of items or search results into categories that provide for the ability of users to drill (or explore in further detail) into search results (or even skip searching entirely) by any value in any field. Each facet displayed can also show a number of hits within a search that match a particular category. Users can then "drill down" by applying specific constraints to the search results. A faceted search can also be called faceted browsing, faceted navigation, guided navigation and sometimes parametric search. The application dashboard 202 may be reconfigured in the manner illustrated in FIG. 9.

Figure 9:
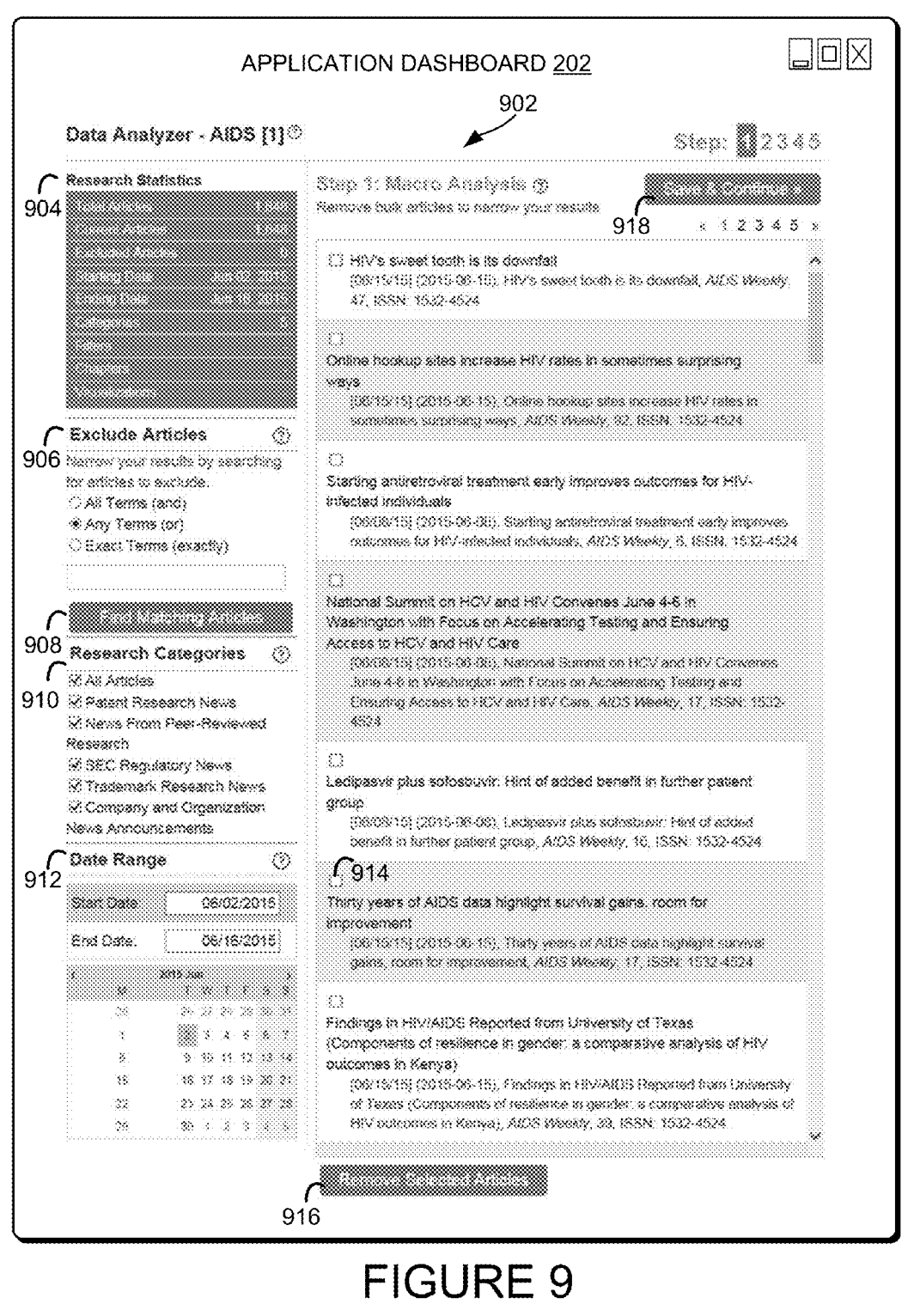

FIG. 9 is a diagram showing the application dashboard 202 after a search is performed by the server computer 104 in conjunction with an analysis function. The results of the searched are rendered in the results section 902. The application dashboard 202 may render a research statistics section 904. The research statistics section 904 may include one or more metrics relating to the search results. For example, the metrics may include, but are not limited to, the total articles in the search results and the date range of the articles found.

In some configurations, the initial results in the results section 902 may be a macro analysis step in which a broad range of search results are returned. In subsequent operations, it may be desirable to narrow the results to a more focused set of resulted. In some examples, the broad range of results may be narrowed using various filters.

One filter may be an exclude articles filter 906. The exclude articles filter 906 may receive as an input one or more terms that, if found in an article in the search results, eliminate the particular article. For example, a user may want to exclude all articles from a particular organization. The user may input the organization's name into the exclude articles filter 906 and select a find matching articles interface 908. Once selected, the analyzer interface application 108 will remove the articles having the organization's name from the search results.

The application dashboard 202 may also have rendered therein a research categories interface 910. The research categories interface 910 may be configured to receive as an input a selection of which subject matter areas or types of articles the search results should be found in. In one example, a user may deselect the "Patent Research News" article type, thus excluding articles associated with the "Patent Research News" article type from the search results.

The application dashboard 202 may further have rendered therein a date range selection interface 912. The date range selection interface 912 may receive as an input a date range of the articles or the data sources 124, within which to include in the search results. Specific articles within the search results may be excluded using a selection interface, such as a selection interface 914. A remove selected articles interface 916 may be selected to remove the articles selected using the selection interface 914. An input may be received at a save and continue interface 918. Once an input is received at the save and continue interface 918, the various filters and other inputs are applied to the search results.

Figure 10A:
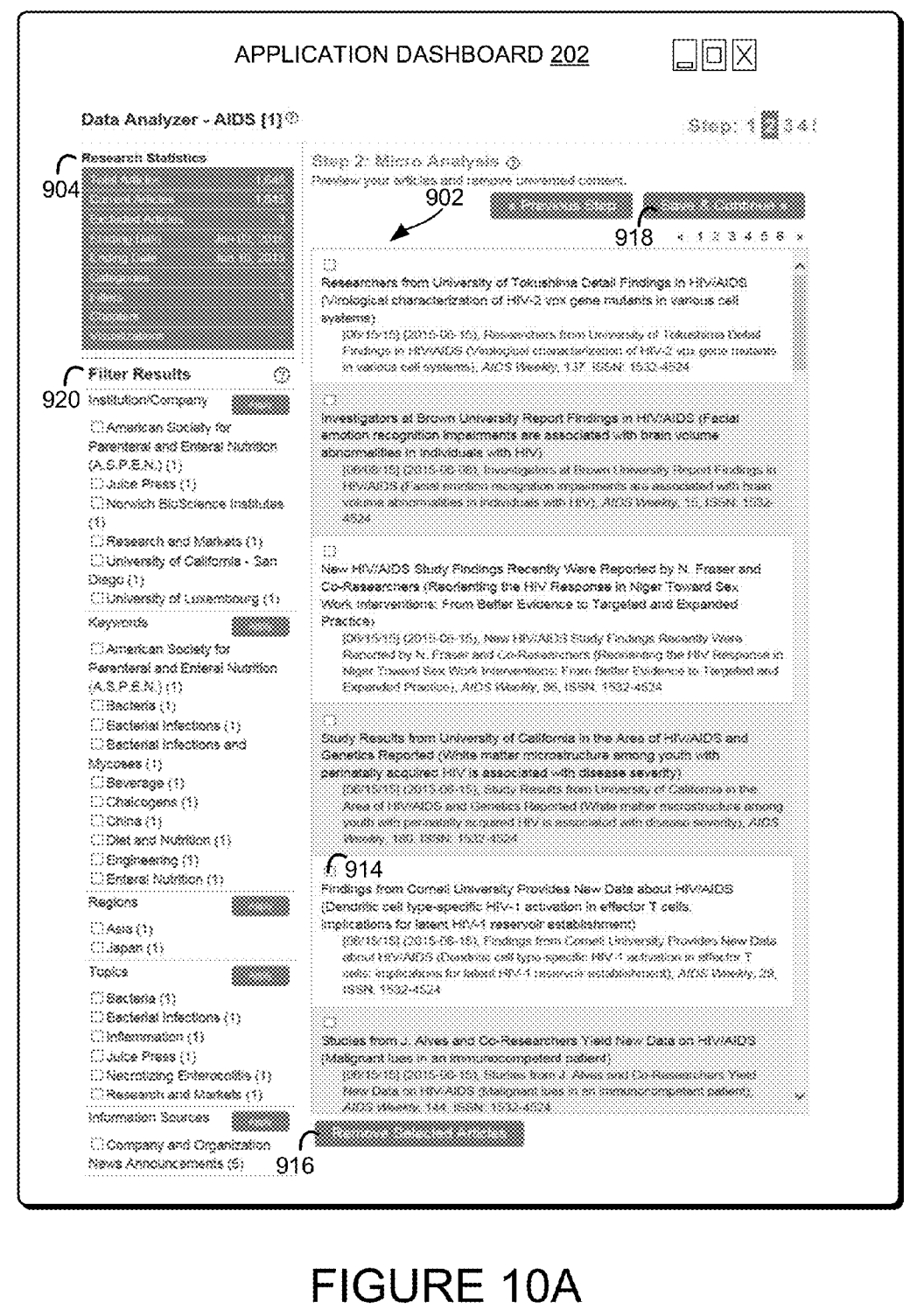

FIG. 10A is a diagram showing the application dashboard 202 after the various filters and other inputs are applied to search results. In some examples, the processes illustrated in FIG. 10A may be termed a micro analysis step. The research statistics section 904 may be updated to indicate the results of applying the input from the configuration of the application dashboard 202 illustrated in FIG. 9.

To further narrow or focus the search results in the results section 902, a filter results interface 920 may be provided. The filter results interface 920 may be configured to receive one or more inputs of various filters to apply. The filters may be generated by terms or other information contained within the search results. In the example illustrated in FIG. 10A, the filters may be "Institution/Company," "Keywords," "Regions," "Topics," and "Information Sources." Each of these filters may be generated as a result of an analysis of the search results or may be predetermined. In one example, the filter entitled, "Regions," includes the locations "Asia" and "Japan." A selection of either one of these will exclude articles from those locations. Keywords may be generated using various technologies. In one example, an example of which is illustrated in FIG. 10B.

Figure 10B:
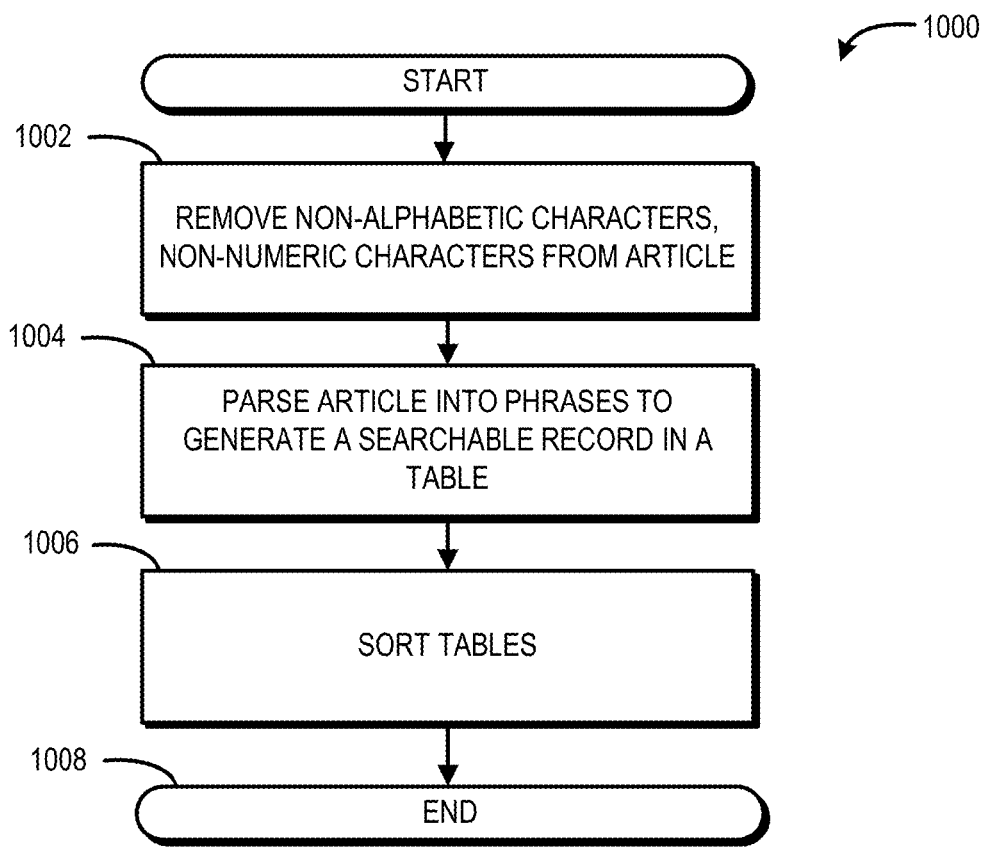
FIG. 10B is a method for generating and applying a keyword.

FIG. 10B is an example method 1000 for generating and applying one or more keywords to associate with an article. At operation 1002, all non-alphanumeric characters are removed from an article. At operation 1004, the article is parsed into phrases to generate a searchable record in a table. The process ends at operation 1008. The following is an illustration of the method 1000.

In the following example, an article comprising a sentence is received. The article for this example is "The cow jumped over the moon." The sentence is parsed into various phrases, such as the below, with each phrase representing a searchable record in a table:

the
the cow
the cow jumped
the cow jumped over
cow
cow jumped
cow jumped over
cow jumped over the
jumped
jumped over
jumped over the
jumped over the moon
over
over the
over the moon In the example illustrated above, the phrases were limited to four terms, although the number of terms may be varied depending on the particular application of method 1000. In another example, the following sentence is provided: "There is a new drug development in AIDS vaccines." Resulting searchable phrases may be "drug development," "AIDS," and "AIDS vaccine." The parsed phrases may be applied as keywords to an article. The keywords may be grouped into particular topics. For example, keywords associated with various cancers may be grouped under the topic, CANCERS. The names of the topics may be used to create chapter titles denoting a collection of articles under a particular topic.

Returning to FIG. 10A, in another example, the "Topics" includes topics such as "Bacteria," "Bacterial Infections," and the like. A selection of one or more of the topics will exclude articles with those topics. Once selected, the remove selected articles interface 916 may be selected to remove the articles selected using the selection interface 914. An input may be received at the save and continue interface 918. Once an input is received at the save and continue interface 918, the various filters and other inputs are applied to the search results.

Figure 11:
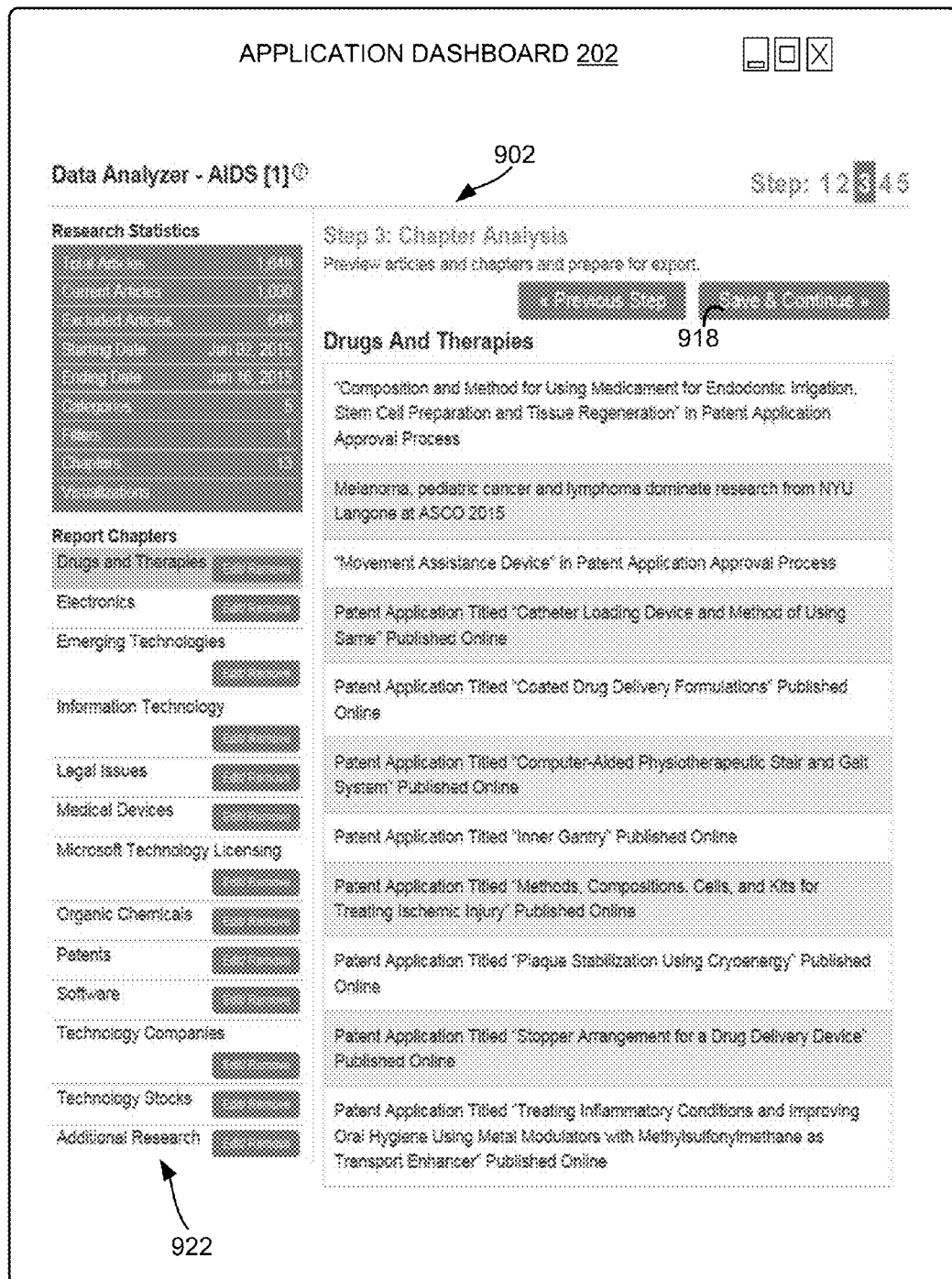
FIG. 11 is a diagram showing an application dashboard after the various filters and other inputs are applied to search results in a micro analysis step.

FIG. 11 is a diagram showing the application dashboard 202 after the various filters and other inputs are applied to search results in the micro analysis step. In FIG. 11, the remaining search results are presented in the results section 902. The research statistics section 904 may be updated to indicate the results of applying the input from the configuration of the application dashboard 202 illustrated in FIG. 10A.

The search results may be analyzed to determine one or chapters to organize the output of the search results. The initial chapters may be rendered in the chapters section 922. The chapters may be generated from various terms found in the search results or subject matter within which the search results belong, or other methods not disclosed herein. For example, the chapters may be based on keywords associated with the articles searched. The keywords may be grouped into topics, with the name of the topic used as the chapter title.

The chapters may be edited or removed. Once an input is received at the save and continue interface 918, the search results are organized into the chapters rendered in the chapters section 922.

Figure 12:
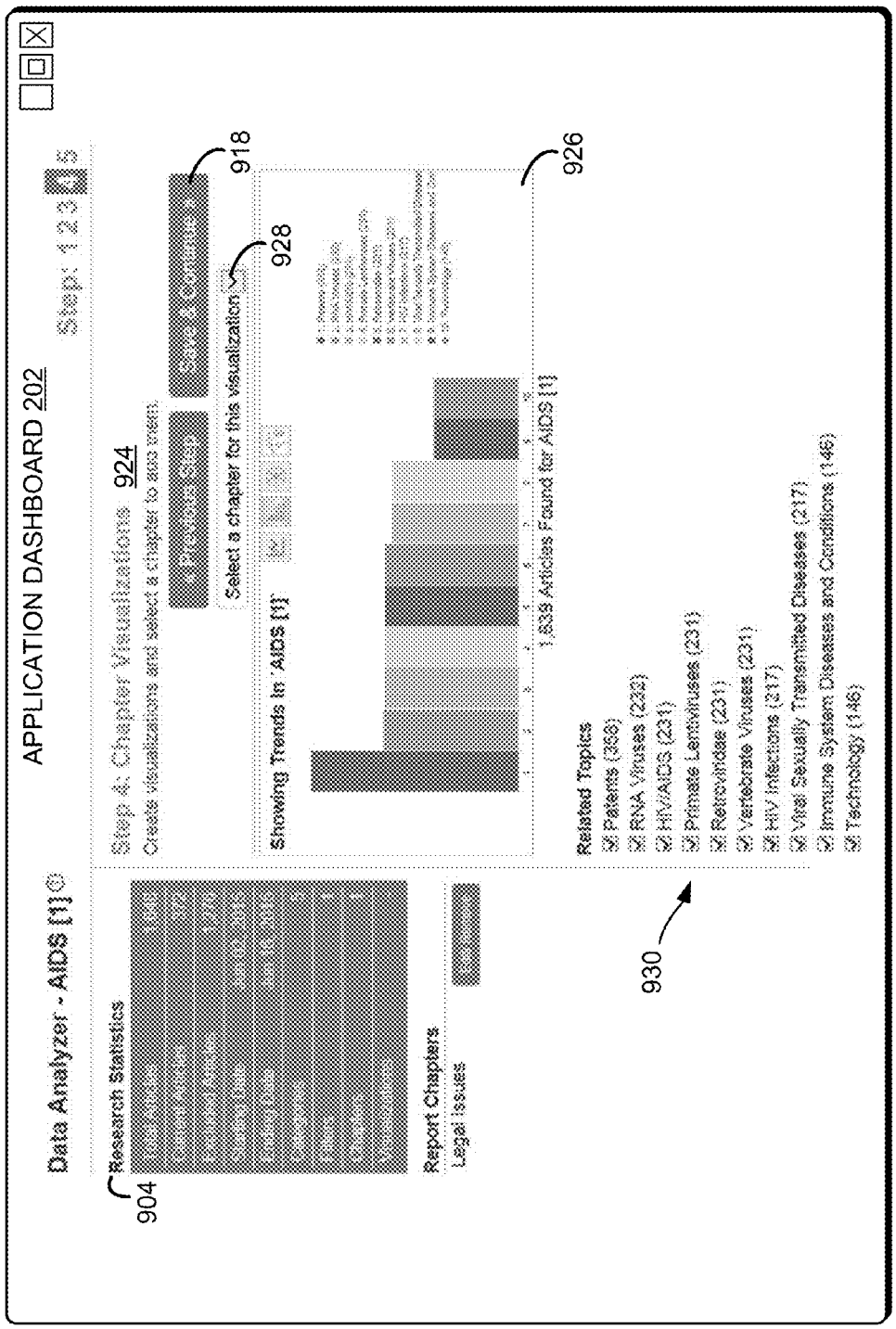
FIG. 12 illustrates an example of a visualization that may be provided for the search results.

FIG. 12 is a diagram showing the application dashboard 202 after the chapters step is performed. The research statistics section 904 may be updated to indicate the results of applying the input from the configuration of the application dashboard 202 illustrated in FIG. 11.

FIG. 12 illustrates an example of a visualization 926 that may be provided for the search results. The visualization 926 may be a graphical representation of various aspects of the results from FIG. 11. In the example illustrated in FIG. 12, the visualization 926 is a bar graph illustrating the number of articles per subject matter, topic, or other category. The visualization 926 may be applicable to a particular chapter and may be changed to various chapters using the chapter selection interface 928. The particular topics within with the results are categorized may be rendered in a related topics section 930. Once an input is received at the save and continue interface 918, the results are organized for download or transmission.

Figure 13:
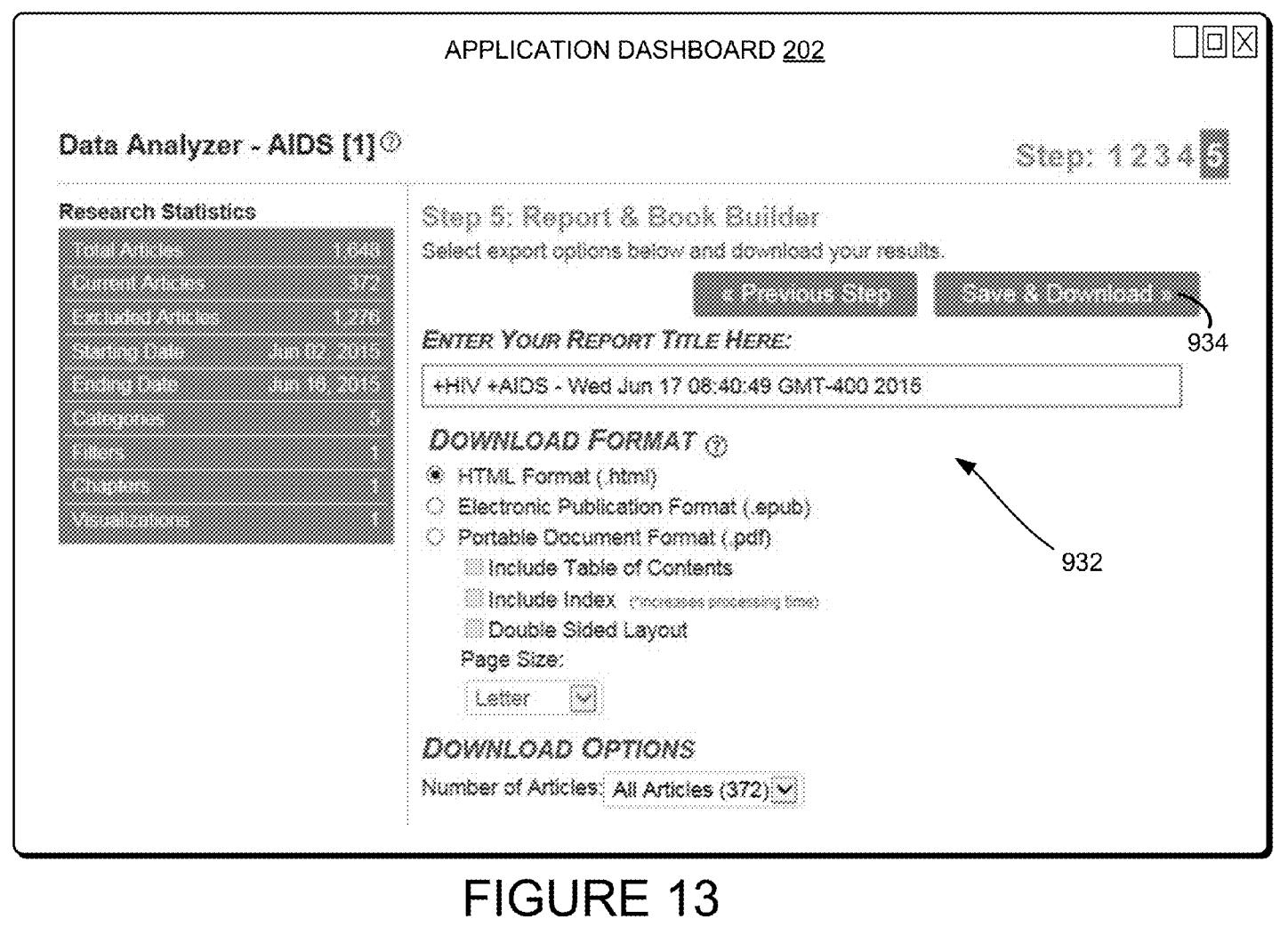

FIG. 13 is a diagram showing the application dashboard 202 having rendered therein a download interface 932. A report may be generated from the results of the operations illustrated above. The title and format of the report may be selected or determined using the download interface 932. A save and download interface 934 may receive an input indicating that the report is to be downloaded for use.

Figure 14:
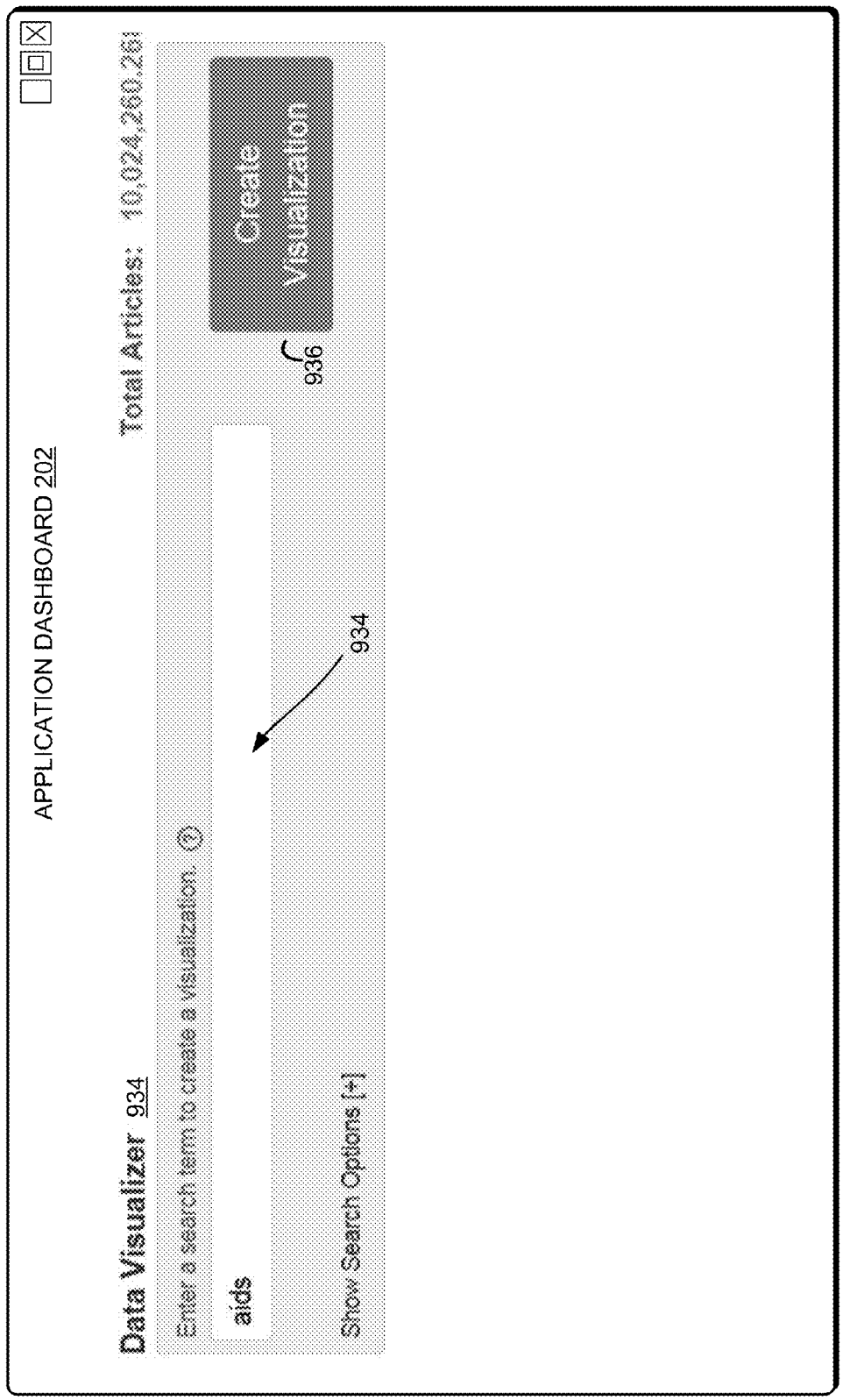
FIG. 14 is a diagram showing an application dashboard in a configuration to provide a visualization.

FIG. 14 is a diagram showing the application dashboard 202 in a configuration to provide a visualization. The application dashboard 202 has rendered therein a data visualizer interface 934. The data visualizer interface 934 may be configured to receive an input of one or more terms from which a visualization is to be generated. Upon a receipt of an input at a create visualization interface 936, the article visualizer 126 of FIG. 1 is invoked by the article analyzer 114. The article analyzer 114 searches the articles data store 116 using the terms provided in the data visualizer interface 934. The results of the search are provided to the article visualizer 126. The article visualizer 126 receives the results and determines one or more metrics from the results, shown by way of example in FIG. 15.

Figure 15:
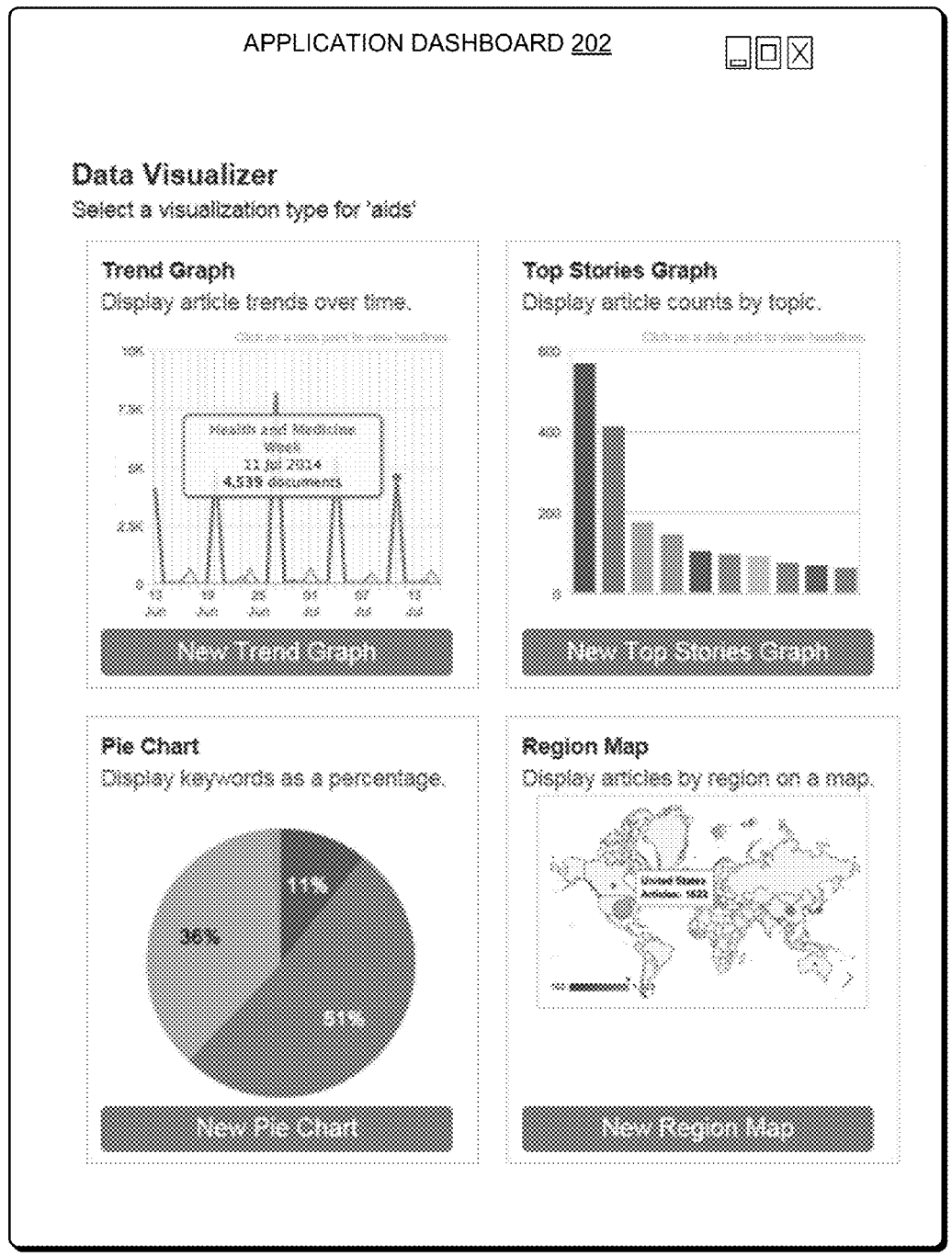
FIG. 15 is a diagram showing an application dashboard having visualizations provided by an article visualizer.

FIG. 15 is a diagram showing the application dashboard 202 having visualizations provided by the article visualizer 126. Although not limited to any particular type, visualizations may include, but are not limited to, trends, top stories, pie charts, and regions. The visualizations may be graphical renditions of various aspects of the search and analysis performed by the article analyzer 114 and the article visualizer 126.

Figure 16:
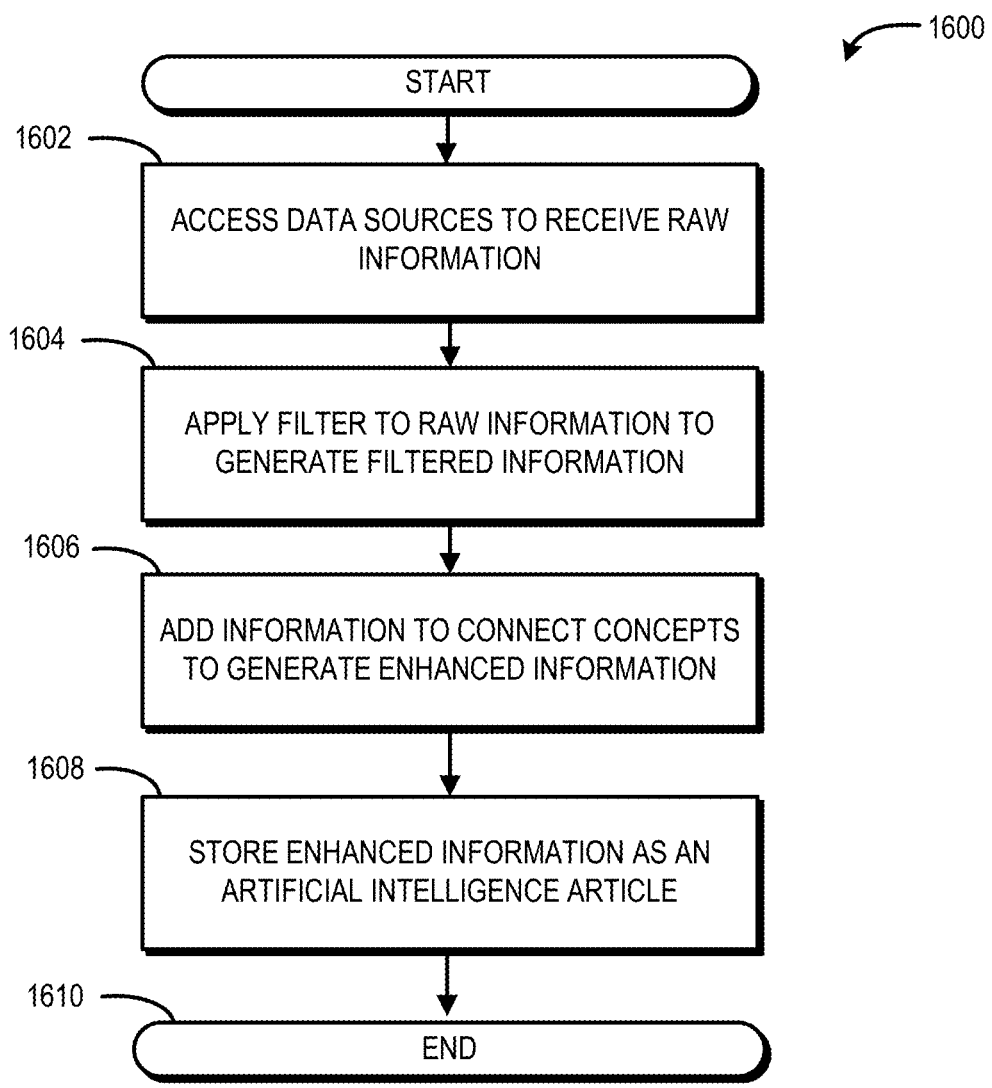
FIG. 16 is a flow diagram showing aspects of a method for generating an artificial intelligence article.

FIG. 16 is a flow diagram showing aspects of a method 1600 for generating an artificial intelligence article, in accordance with some embodiments. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The operations of the method 800 are described herein below as being implemented, at least in part, by the user device 102 and/or the server computer 104 (described above with regard to FIG. 1). One or more of the operations of the method 800 may alternatively or additionally be implemented, at least in part, by the similar components in a computer utilizing the computer architecture 1800 of FIG. 18 or a similarly configured computer providing the operating environment 1900.

Now with reference to FIG. 16, the method 1600 begins and proceeds to operation 1602, where data sources are accessed to receive raw information. The data sources may include information provided on various Internet websites, periodicals, regulatory and/or governmental agencies, and the like. The presently disclosed subject matter is not limited to any particular type of data source.

The method proceeds to operation 1604, where one or more filters are applied to the raw information. The filters may be filters designed to remove words or text that are superfluous, indicate bias or opinion, or are otherwise undesired. The use of the filters on the raw information results in the generation of filtered information.

The method proceeds to operation 1606, where information is added to the filtered information to connect concepts. The added information may be information (e.g. text) that, when added, to the filtered information, creates sentences that are akin to sentences desired or used by humans. The added information creates enhanced information.

The method proceeds to operation 1608, where the enhanced information is stored as an artificial intelligence article. The method 1600 thereafter ends at operation 1610.

Figure 17:
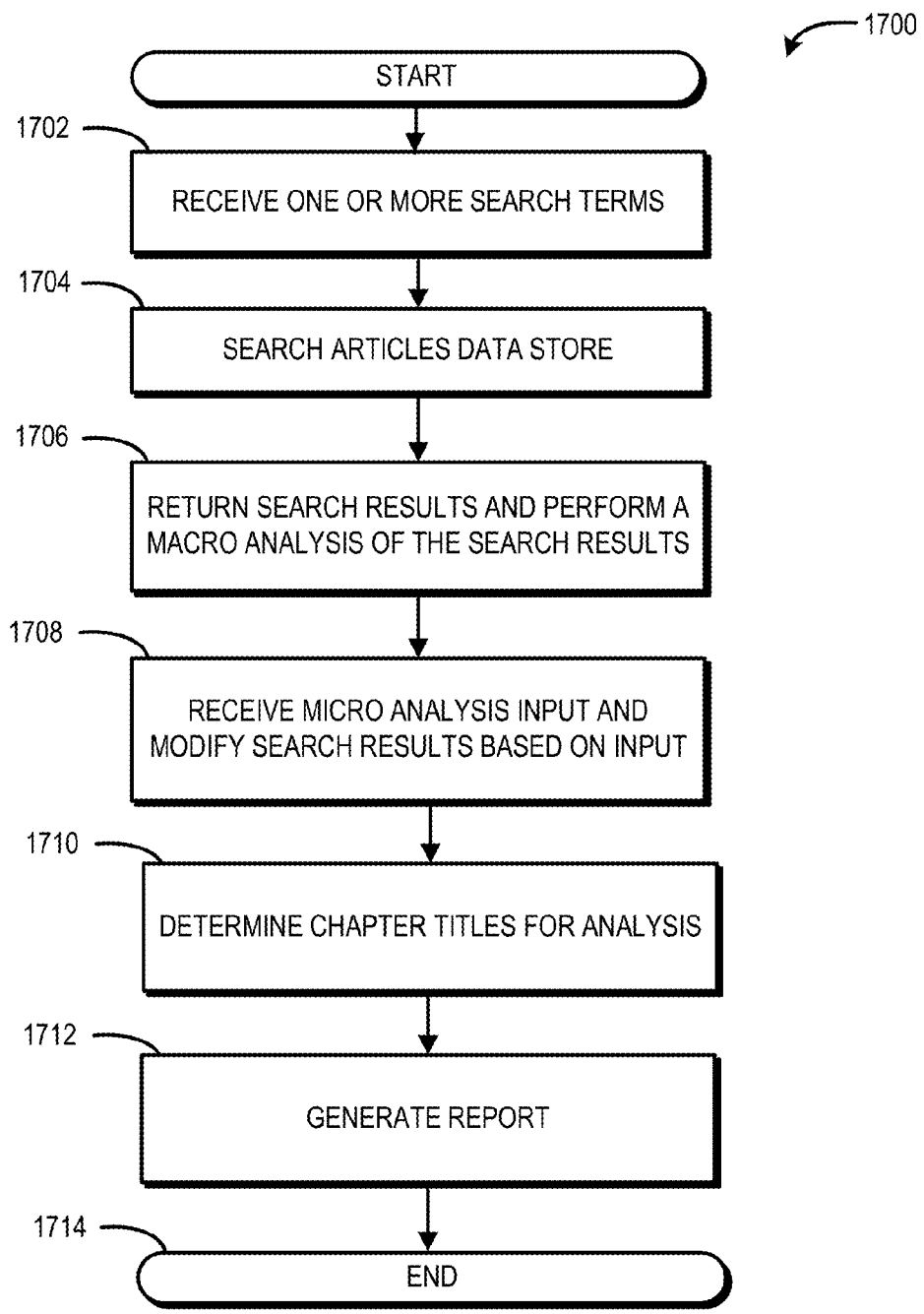
FIG. 17 is a flow diagram showing aspects of a method for analyzing data using artificial intelligence articles.

FIG. 17 is a flow diagram showing aspects of a method 1700 for analyzing data using artificial intelligence articles, in accordance with some embodiments.

The method 1700 commences at operation 1702, where one or more search terms are received by an article analyzer from an analyzer interface application. The search terms may include one or more subjects, key words, and the like associated with a desired analysis.

The method 1700 proceeds to operation 1704, where the article analyzer searches the articles data store for articles relevant to the search terms entered in operation 1702. The articles may be relevant if the articles include the terms or include concepts similar to the terms received in operation 1702. In some examples, the articles data store may include both artificial intelligence articles or human articles, or both.

The method 1700 proceeds to operation 1706, where the search results are returned to the analyzer interface application. The analyzer interface application may render the search results in a display. To focus or narrow the search results, a macro analysis may be performed. In some examples, the macro analysis may include one or more filters, exclusionary terms, date rangers, categories, and the like. The search results are modified based on the macro analysis inputs. In some examples, the macro analysis may help narrow the search results.

The method 1700 proceeds to operation 1708, where micro analysis inputs are received. In some examples, the micro analysis may be used to remove unwanted content. In these examples, various concepts, topics, categories, information sources may be selected to be excluded. The search results are further narrowed upon receipt of the micro analysis input.

The method 1700 proceeds to operation 1710, where one or more chapter titles are determined. The chapter titles may be determined based on the subject matter of the search results, particular key words or phrases in the search results, the data sources from which the articles were generated, or other technologies. The presently disclosed subject matter is not limited to any particular technology for generating chapter titles. In some examples, the chapter titles may be removed or edited.

The method 1700 proceeds to operation 1712, where a report is generated. The report may include the articles from the search results separated into the chapter titles from operation 1710. The report may be downloadable. The method 1700 thereafter ends at operation 1714.

Figure 18:
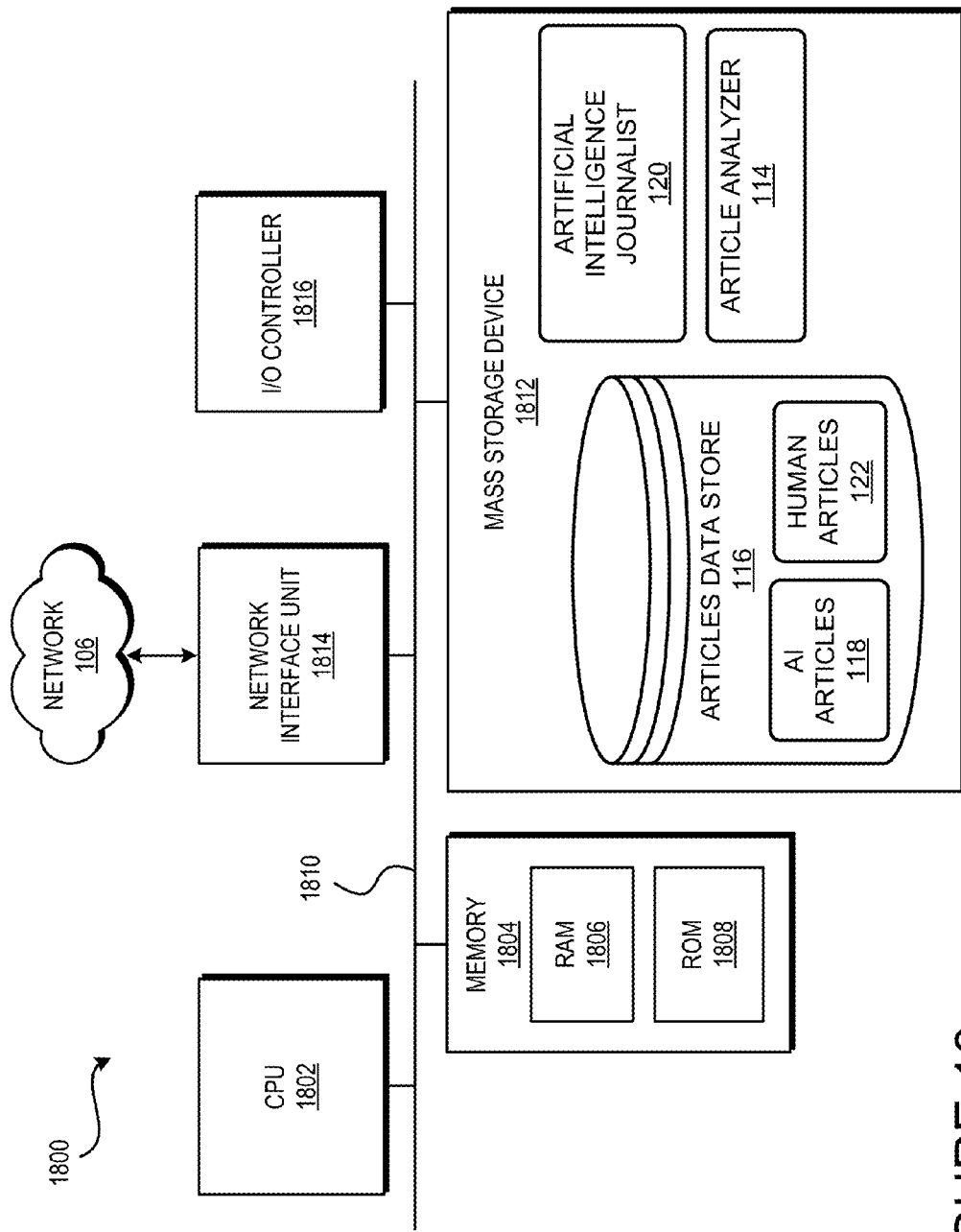
FIG. 18 illustrates an illustrative computer architecture for a device capable of executing the software and/or hardware components described herein for an artificial intelligence article analysis interface.

FIG. 18 illustrates an illustrative computer architecture 1800 for a device capable of executing the software and/or hardware components described herein for an artificial intelligence article analysis interface, in accordance with some embodiments. Thus, the computer architecture 1800 illustrated in FIG. 18 illustrates an architecture for a server computer, mobile phone, a PDA, a smart phone, a desktop computer, a netbook computer, a tablet computer, and/or a laptop computer. The computer architecture 1800 may be utilized to execute any aspects of the software components presented herein.

The computer architecture 1800 illustrated in FIG. 18 includes a central processing unit 1802 ("CPU"), a system memory 1804, including a random access memory 1806 ("RAM") and a read-only memory ("ROM") 1808, and a system bus 1810 that couples the memory 1804 to the CPU 1802. A basic input/output system containing the basic routines that help to transfer information between elements within the computer architecture 1800, such as during startup, is stored in the ROM 1808. The computer architecture 1800 further includes a mass storage device 1812 for storing the article analyzer 114, the artificial intelligence journalist 120, the articles data store 116, the AI articles 118, and the human articles 122.

The mass storage device 1812 is communicatively connected to the CPU 1802 through a mass storage controller (not shown) connected to the bus 1810. The mass storage device 1812 and its associated computer-readable media provide non-volatile storage for the computer architecture 1800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 1800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1800. For purposes the claims, the phrase "computer storage medium" and variations thereof, does not include waves, signals, and/or other transitory and/or intangible communication media, per se.

According to various embodiments, the computer architecture 1800 may operate in a networked environment using logical connections to remote computers through a network such as the network 106. The computer architecture 1800 may connect to the network 106 through a network interface unit 1814 connected to the bus 1810. It should be appreciated that the network interface unit 1814 also may be utilized to connect to other types of networks and remote computer systems. The computer architecture 1800 also may include an input/output controller 1816 for receiving and processing input from a number of other devices, including a keyboard, mouse, or electronic stylus (not shown in FIG. 18). Similarly, the input/output controller 1816 may provide output to a display screen, a printer, or other type of output device (also not shown in FIG. 18).

It should be appreciated that the software components described herein may, when loaded into the CPU 1802 and executed, transform the CPU 1802 and the overall computer architecture 1800 from a general-purpose computing system into a special-purpose computing system customized to facilitate the functionality presented herein. The CPU 1802 may be constructed from any number of transistors or other discrete circuit elements, which may individually or collectively assume any number of states. More specifically, the CPU 1802 may operate as a finite-state machine, in response to executable instructions contained within the software modules disclosed herein. These computer-executable instructions may transform the CPU 1802 by specifying how the CPU 1802 transitions between states, thereby transforming the transistors or other discrete hardware elements constituting the CPU 1802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1800 in order to store and execute the components presented herein. It also should be appreciated that the computer architecture 1800 may include other types of computing devices, including hand-held computers, embedded computer systems, personal digital assistants, and other types of computing devices known to those skilled in the art. It is also contemplated that the computer architecture 1800 may not include all of the components shown in FIG. 18, may include other components that are not explicitly shown in FIG. 18, or may utilize an architecture completely different than that shown in FIG. 18.

FIG. 19 illustrates an illustrative distributed computing environment 1900 capable of executing the software and/or hardware components described herein for an artificial intelligence article analysis interface, in accordance with some embodiments. Thus, the distributed computing environment 1900 illustrated in FIG. 19 can be used to provide the functionality described herein with respect to the user device 102, the server computer 104, and/or the user device 114. The distributed computing environment 1900 thus may be utilized to execute any aspects of the software components presented herein.

According to various implementations, the distributed computing environment 1900 includes a computing environment 1902 operating on, in communication with, or as part of the network 106. The network 106 also can include various access networks. One or more client devices 1906A-1906N (hereinafter referred to collectively and/or generically as "clients 1906") can communicate with the computing environment 1902 via the network 106 and/or other connections (not illustrated in FIG. 19). In the illustrated embodiment, the clients 1906 include a computing device 1906A such as a laptop computer, a desktop computer, or other computing device; a slate or tablet computing device ("tablet computing device") 1906B; a mobile computing device 1906C such as a mobile telephone, a smart phone, or other mobile computing device; a server computer 1906D; and/or other devices 1906N. It should be understood that any number of clients 1906 can communicate with the computing environment 1902. It should be understood that the illustrated clients 1906 and computing architectures illustrated and described herein are illustrative, and should not be construed as being limited in any way.

In the illustrated embodiment, the computing environment 1902 includes application servers 1908, data storage 1910, and one or more network interfaces 1912. According to various implementations, the functionality of the application servers 1908 can be provided by one or more server computers that are executing as part of, or in communication with, the network 1904. The application servers 1908 can host various services, virtual machines, portals, and/or other resources. In the illustrated embodiment, the application servers 1908 host one or more virtual machines 1914 for hosting applications or other functionality. According to various implementations, the virtual machines 1914 host one or more applications and/or software modules for providing the functionality described herein for use in an artificial intelligence article analysis interface. It should be understood that this embodiment is illustrative, and should not be construed as being limiting in any way. The application servers 1908 also host or provide access to one or more Web portals, link pages, Web sites, and/or other information ("Web portals") 1916.

As shown in FIG. 19, the application servers 1908 also can host other services, applications, portals, and/or other resources ("other resources") 1924. It thus can be appreciated that the computing environment 1902 can provide integration of the concepts and technologies disclosed herein provided herein for use in an artificial intelligence article analysis interface. It should be understood that these embodiments are illustrative, and should not be construed as being limiting in any way.

As mentioned above, the computing environment 1902 can include the data storage 1910. According to various implementations, the functionality of the data storage 1910 is provided by one or more databases operating on, or in communication with, the network 1904. The functionality of the data storage 1910 also can be provided by one or more server computers configured to host data for the computing environment 1902. The data storage 1910 can include, host, or provide one or more real or virtual data stores 1926A-1926N (hereinafter referred to collectively and/or generically as "data stores 1926"). The data stores 1926 are configured to host data used or created by the application servers 1908 and/or other data.

The computing environment 1902 can communicate with, or be accessed by, the network interfaces 1912. The network interfaces 1912 can include various types of network hardware and software for supporting communications between two or more computing devices including, but not limited to, the clients 1906 and the application servers 1908. It should be appreciated that the network interfaces 1912 also may be utilized to connect to other types of networks and/or computer systems.

It should be understood that the distributed computing environment 1900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1900 provides the software functionality described herein as a service to the clients 1906. It should be understood that the clients 1906 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 1900 to utilize the functionality described herein for use in an artificial intelligence article analysis interface.

Based on the foregoing, it should be appreciated that technologies for use in an artificial intelligence article analysis interface have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer, comprising:
   a processor; and
   a computer-readable medium in communication with the processor, the computer-readable medium comprising computer-executable instructions that, when executed by the processor, cause the computer to
   receive a search query,
   receive an AI/human requirement input identifying a ratio of artificial intelligence articles to human articles provided in a plurality of search results,
   search, using the search query, an articles data store, the articles data store comprising a plurality of artificial intelligence articles and human articles, to generate the plurality of search results, wherein the plurality of search results comprises artificial intelligence articles and human articles in the ratio identified in the AI/human requirement input, wherein the artificial intelligence articles and the human articles relate to an event or discovery, determine a plurality of metrics relating to the plurality of search results, output a visualization using the plurality of metrics,
   perform an analysis on the plurality of search results, and
   generate a report based on the analysis.

2. The computer of claim 1, wherein the articles data store further comprises a plurality of human articles.

3. The computer of claim 1, wherein the computer-executable instructions to perform an analysis comprises computer-executable instructions to perform a macro analysis of the search results using one or more filters to filter out one or more results of the plurality of search results.

4. The computer of claim 3, wherein the computer-executable instructions to perform an analysis further comprises computer-executable instructions to perform a micro analysis using one or more keywords to remove unwanted content.

5. The computer of claim 1, further comprising computer-executable instructions that cause the computer to determine one or more chapter titles for the report.

6. The computer of claim 5, further comprising computer-executable instructions that cause the computer to separate the report into the one or more chapter titles.

7. The computer of claim 5, wherein the one or more chapter titles are one or more topics associated with the plurality of search results.

8. The computer of claim 7, wherein a topic of the one or more topics comprises a grouping of keywords associated with a particular subject, whereby the subject is the topic.

9. The computer of claim 8, wherein the grouping of keywords is generated by:
   removing non-alphabetic and non-numeric characters from an article,
   parsing the article into phrases to generate a searchable record of the phrases in a table; and
   sorting the table.

10. A method, comprising:
    receiving a search query;
    receiving an AI/human requirement input identifying a ratio of artificial intelligence articles to human articles provided in a plurality of search results;
    searching an articles data store using the search query to generate a plurality of search results, the articles data store comprising a plurality of artificial intelligence articles, wherein the plurality of search results comprises artificial intelligence articles and human articles in the ratio identified in the AI/human requirement input, wherein the artificial intelligence articles and the human articles relate to an event or discovery;
    performing a macro analysis on the plurality of search results using one or more filters to filter out one or more results of the plurality of search results;
    performing a micro analysis on the plurality of search results using one or more keywords to remove unwanted content;
    determining a plurality of metrics relating to the plurality of search results,
    outputting a visualization using the plurality of metrics, and
    generating a report based on the analysis.

11. The method of claim 10, wherein the articles data store further comprises a plurality of human articles.

12. The method of claim 10, further comprising determining one or more chapter titles for the report.

13. The method of claim 12, further comprising separating the report into the one or more chapter titles.

14. The method of claim 13, wherein the one or more chapter titles are one or more topics associated with the plurality of search results.

15. The method of claim 14, wherein a topic of the one or more topics comprises a grouping of keywords associated with a particular subject, whereby the subject is the topic.

16. The method of claim 15, wherein the grouping of keywords is generated by:

removing non-alphabetic and non-numeric characters from an article,
parsing the article into phrases to generate a searchable record of the phrases in a table; and
sorting the table.

17. A nontransitory computer-readable storage medium having computer-executable instructions thereupon that, when executed by a computer, cause the computer to:
  execute an article analyzer that
    receives a search query,
    receives an AI/human requirement input identifying a ratio of artificial intelligence articles to human articles provided in a plurality of search results;
    searches an articles data store that comprises a plurality of artificial intelligence articles using the search query to generate the plurality of search results, wherein the plurality of search results comprises artificial intelligence articles and human articles in the ratio identified in the AI/human requirement input, wherein the artificial intelligence articles and the human articles relate to an event or discovery,
    determines a plurality of metrics relating to the plurality of search results,
    outputs a visualization using the plurality of metrics,
    performs a macro analysis on the plurality of search results using one or more filters to filter out one or more results of the plurality of search results,
    performs a micro analysis on the plurality of search results using one or more keywords to remove unwanted content, and
    generates a report based on the analysis; and
  execute an article visualizer that outputs a visualization using the plurality of metrics.

* * * * *